US008699105B2

(12) United States Patent
Katayama

(10) Patent No.: US 8,699,105 B2
(45) Date of Patent: Apr. 15, 2014

(54) PROFILE GENERATING APPARATUS, PROFILE GENERATING METHOD, COMPUTER-READABLE RECORDING MEDIUM WITH PROFILE GENERATING PROGRAM RECORDED THEREIN, AND PRINTING SYSTEM

(75) Inventor: Takeshi Katayama, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 577 days.

(21) Appl. No.: 12/893,933

(22) Filed: Sep. 29, 2010

(65) Prior Publication Data

US 2011/0075173 A1      Mar. 31, 2011

(30) Foreign Application Priority Data

Sep. 30, 2009  (JP) ................................ 2009-228582

(51) Int. Cl.
*H04N 1/60* (2006.01)

(52) U.S. Cl.
USPC ............ 358/518; 358/1.1; 358/1.9; 358/1.15; 399/321; 399/341; 399/342; 347/98

(58) Field of Classification Search
None
See application file for complete search history.

(56) References Cited

U.S. PATENT DOCUMENTS

| 4,178,096 | A | * | 12/1979 | Lontz | 355/32 |
|---|---|---|---|---|---|
| 4,305,768 | A | * | 12/1981 | Lontz | 156/64 |
| 5,478,157 | A | * | 12/1995 | Kohno et al. | 400/120.02 |
| 6,527,356 | B1 | * | 3/2003 | Spurr et al. | 347/16 |
| 6,717,626 | B1 | * | 4/2004 | Kondo et al. | 348/756 |
| 6,985,254 | B2 | * | 1/2006 | Allen et al. | 358/1.9 |
| 7,236,734 | B2 | * | 6/2007 | Ng et al. | 399/341 |
| 7,256,913 | B2 | * | 8/2007 | Jacob et al. | 358/1.9 |
| 7,340,208 | B2 | * | 3/2008 | Ng | 399/329 |
| 7,502,582 | B2 | * | 3/2009 | Ng et al. | 399/296 |
| 7,720,425 | B2 | * | 5/2010 | Ng et al. | 399/342 |
| 7,924,460 | B2 | * | 4/2011 | Ng | 358/1.9 |
| 8,005,415 | B2 | * | 8/2011 | Ng et al. | 399/342 |
| 2002/0180996 | A1 | * | 12/2002 | Allen et al. | 358/1.9 |
| 2003/0072043 | A1 | * | 4/2003 | Hagai et al. | 358/518 |
| 2005/0243341 | A1 | * | 11/2005 | Ng | 358/1.9 |

(Continued)

FOREIGN PATENT DOCUMENTS

JP      2003110867 A      4/2003
JP      2007-81586 A      3/2007

OTHER PUBLICATIONS

David Kappos, Subject Matter Eligibility of Computer Readable Media, US Patent and Trademark Office, Feb. 23, 2010, 1351 OG 212.*

(Continued)

*Primary Examiner* — King Poon
*Assistant Examiner* — Ted Barnes
(74) *Attorney, Agent, or Firm* — Sughrue Mion, PLLC

(57) ABSTRACT

A group of spectral data of print mediums and a group of laminating film spectral data are stored, which correspond to a plurality of colors on a color chart. The type of print medium and the type of laminating film are entered. From the group of spectral data of print mediums and the group of laminating film spectral data, spectral data corresponding to the entered type of print medium are entered as first spectral data, and spectral data corresponding to the entered type of laminating film are entered as second spectral data. Colorimetric value data of the colors are calculated using the first spectral data and the second spectral data.

8 Claims, 15 Drawing Sheets

(56) References Cited

U.S. PATENT DOCUMENTS

| | | |
|---|---|---|
| 2006/0187505 A1* | 8/2006 | Ng et al. .................. 358/518 |
| 2007/0058186 A1* | 3/2007 | Tanaka .................... 358/1.9 |
| 2007/0287082 A1* | 12/2007 | Ng ........................ 430/47.5 |
| 2007/0289705 A1* | 12/2007 | Johnson et al. ............ 156/277 |
| 2008/0018097 A1* | 1/2008 | Wicker et al. ............... 283/91 |
| 2008/0130023 A1* | 6/2008 | Perez et al. ............... 358/1.9 |
| 2008/0180727 A1* | 7/2008 | Chatow et al. ............ 358/1.15 |
| 2008/0282915 A1* | 11/2008 | Horita ..................... 101/211 |
| 2009/0021807 A1* | 1/2009 | Horita ..................... 358/518 |
| 2009/0219554 A1* | 9/2009 | Freyer et al. .............. 358/1.9 |
| 2009/0256929 A1* | 10/2009 | Ishii ...................... 348/223.1 |
| 2010/0067026 A1* | 3/2010 | Horita ..................... 358/1.9 |
| 2010/0067783 A1* | 3/2010 | Horita ..................... 382/162 |
| 2012/0099121 A1* | 4/2012 | No et al. .................. 358/1.1 |
| 2012/0099122 A1* | 4/2012 | No et al. .................. 358/1.1 |

OTHER PUBLICATIONS

Rejection of the Application, dated Jun. 18, 2013, issued in corresponding JP Application No. 2009-228582, 13 pages in English and Japanese.

\* cited by examiner

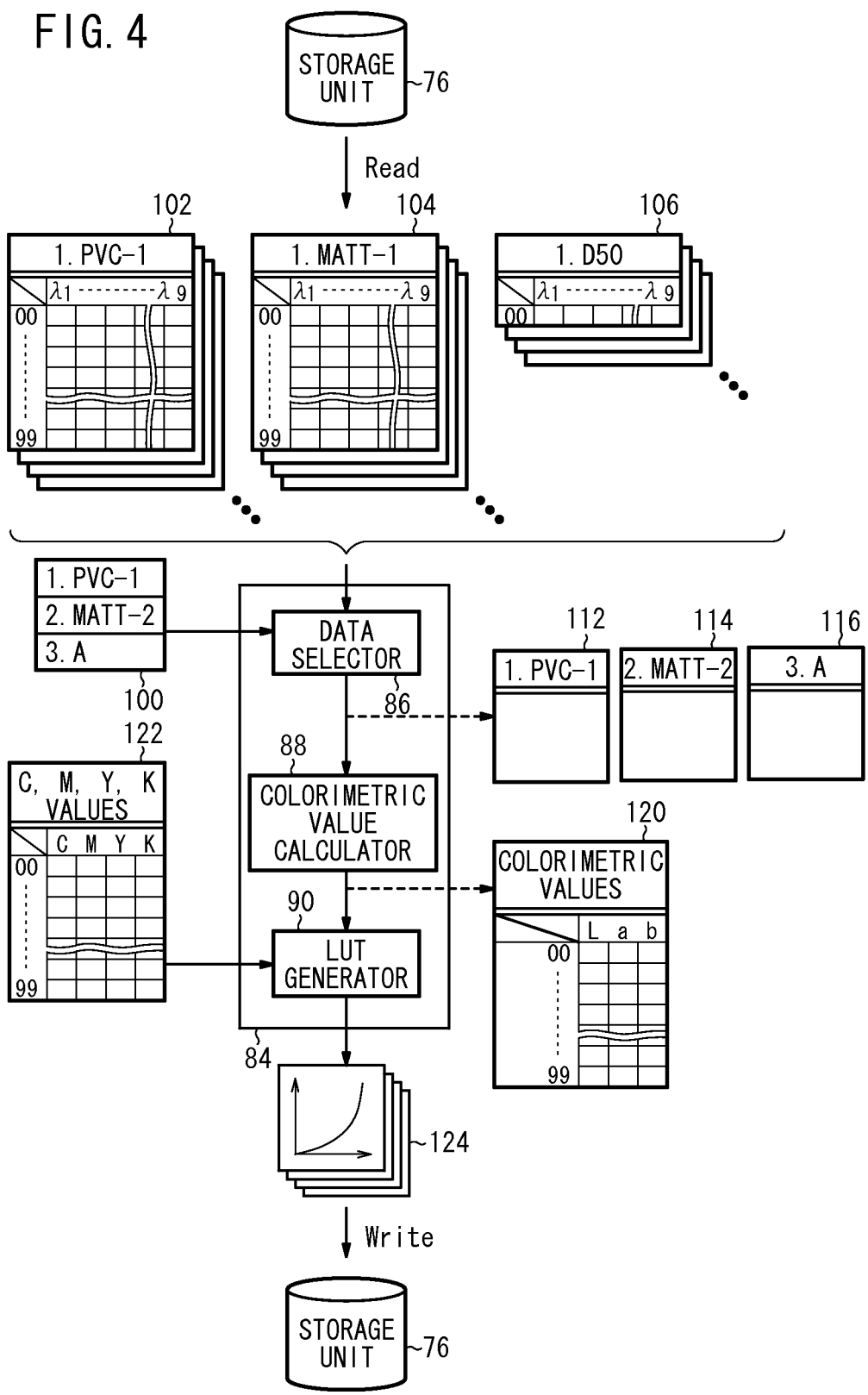

FIG. 5A

SETTING OF PROFILE GENERATING CONDITIONS

| PRINT MEDIUM | PVC A ▷ | 132 |
| LAMINATING FILM | MATT B ▷ | 134 |
| LIGHT SOURCE | A ▷ | 136 |
| PROFILE NAME | | 138 |

GENERATE 140   CANCEL 142

FIG. 5B

SETTING OF PROFILE GENERATING CONDITIONS

| PRINT MEDIUM | PVC A ▷ | 132 |
| LAMINATING FILM | PVC A / PVC C / TARPAULIN A / TARPAULIN B ◁▨ | 146, 144 |
| LIGHT SOURCE | | |
| PROFILE NAME | | 138 |

GENERATE 140   CANCEL 142

FIG. 5C

SETTING OF PROFILE GENERATING CONDITIONS

| PRINT MEDIUM | PVC A ▷ | 132 |
| LAMINATING FILM | MATT B ▷ | 134 |
| LIGHT SOURCE | MATT B / SEMI MATT A / SEMI MATT B / GLOSS A ◁▨ | 150, 148 |
| PROFILE NAME | ▷ | |

GENERATE 140   CANCEL 142

FIG. 5D

SETTING OF PROFILE GENERATING CONDITIONS

| PRINT MEDIUM | PVC A ▷ | 132 |
| LAMINATING FILM | MATT B ▷ | 134 |
| LIGHT SOURCE | A ▷ | 136 |
| PROFILE NAME | D50 / D65 / A / F8 ◁▨▷ | 154, 152 |

142

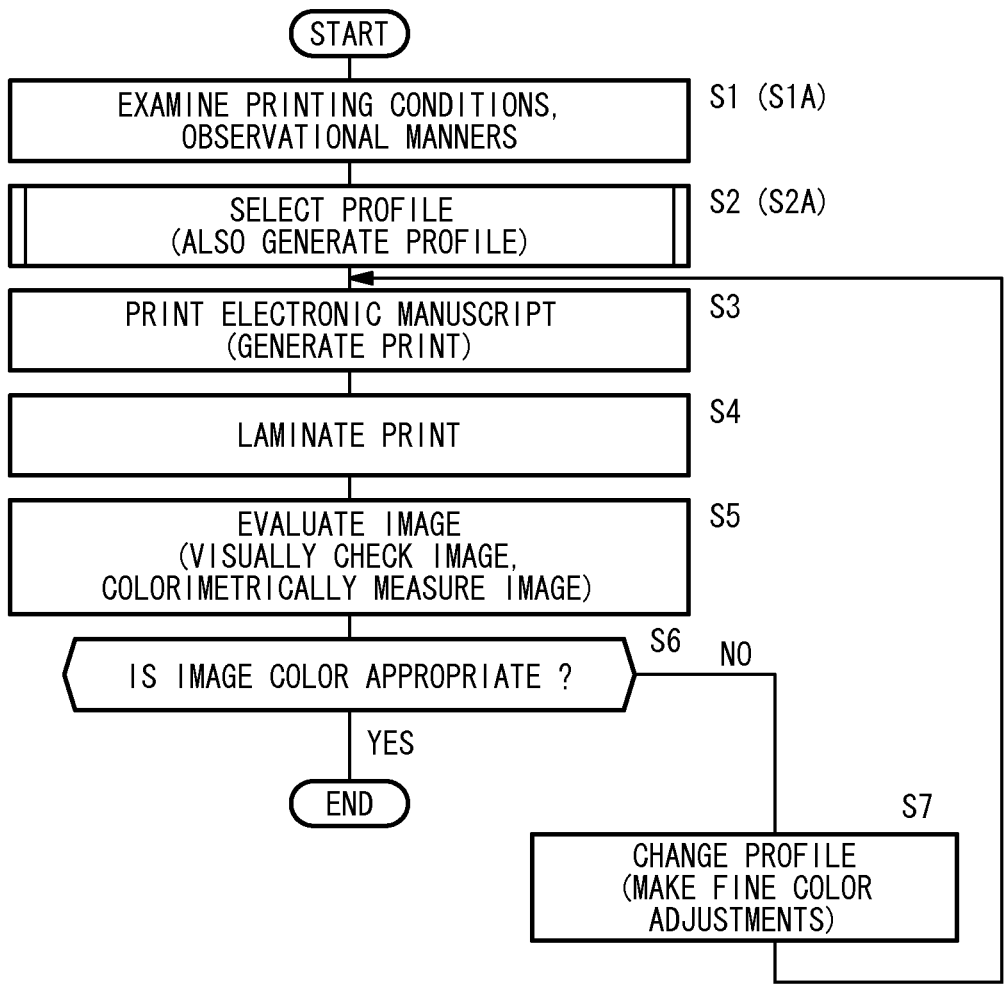

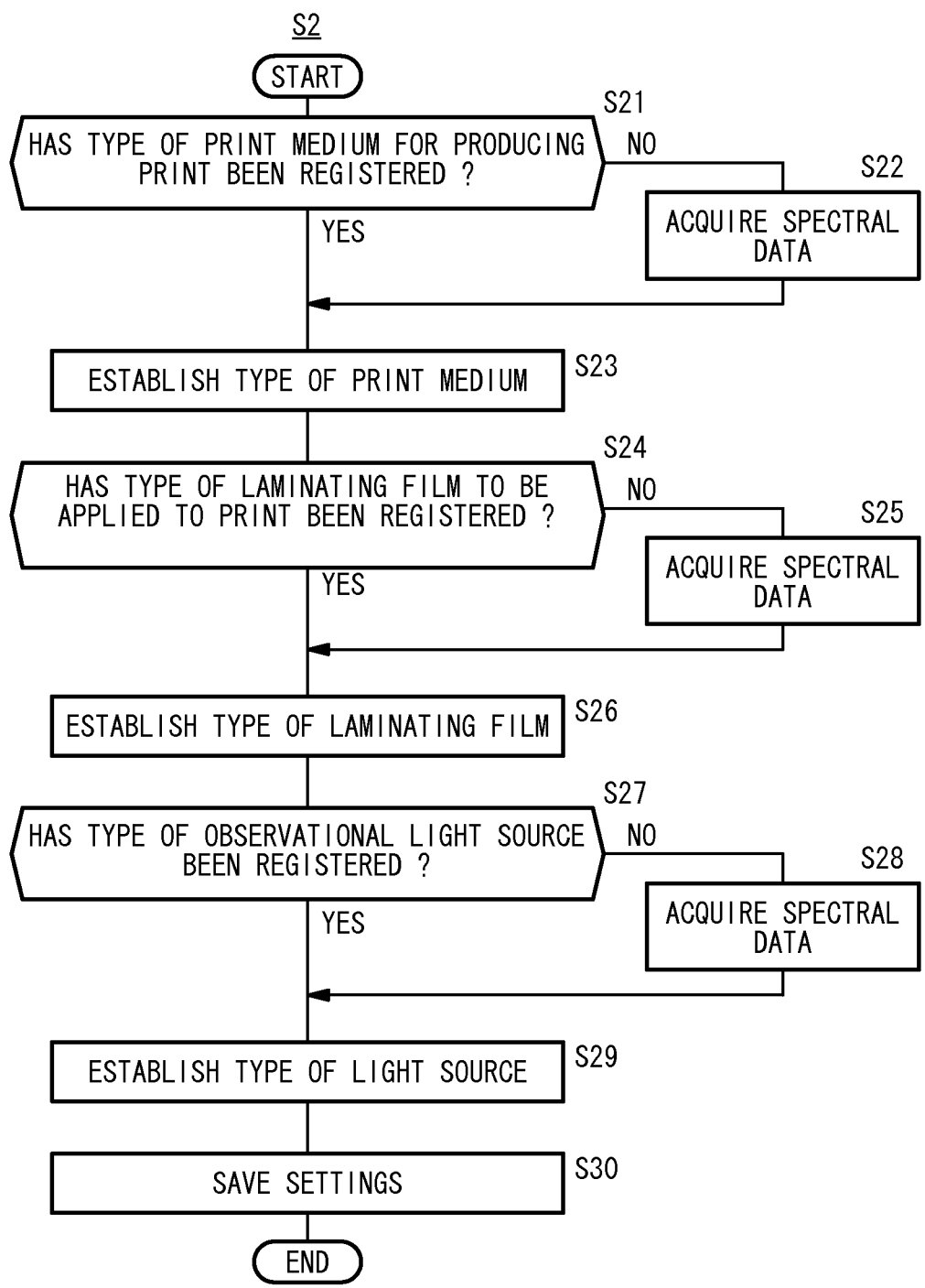

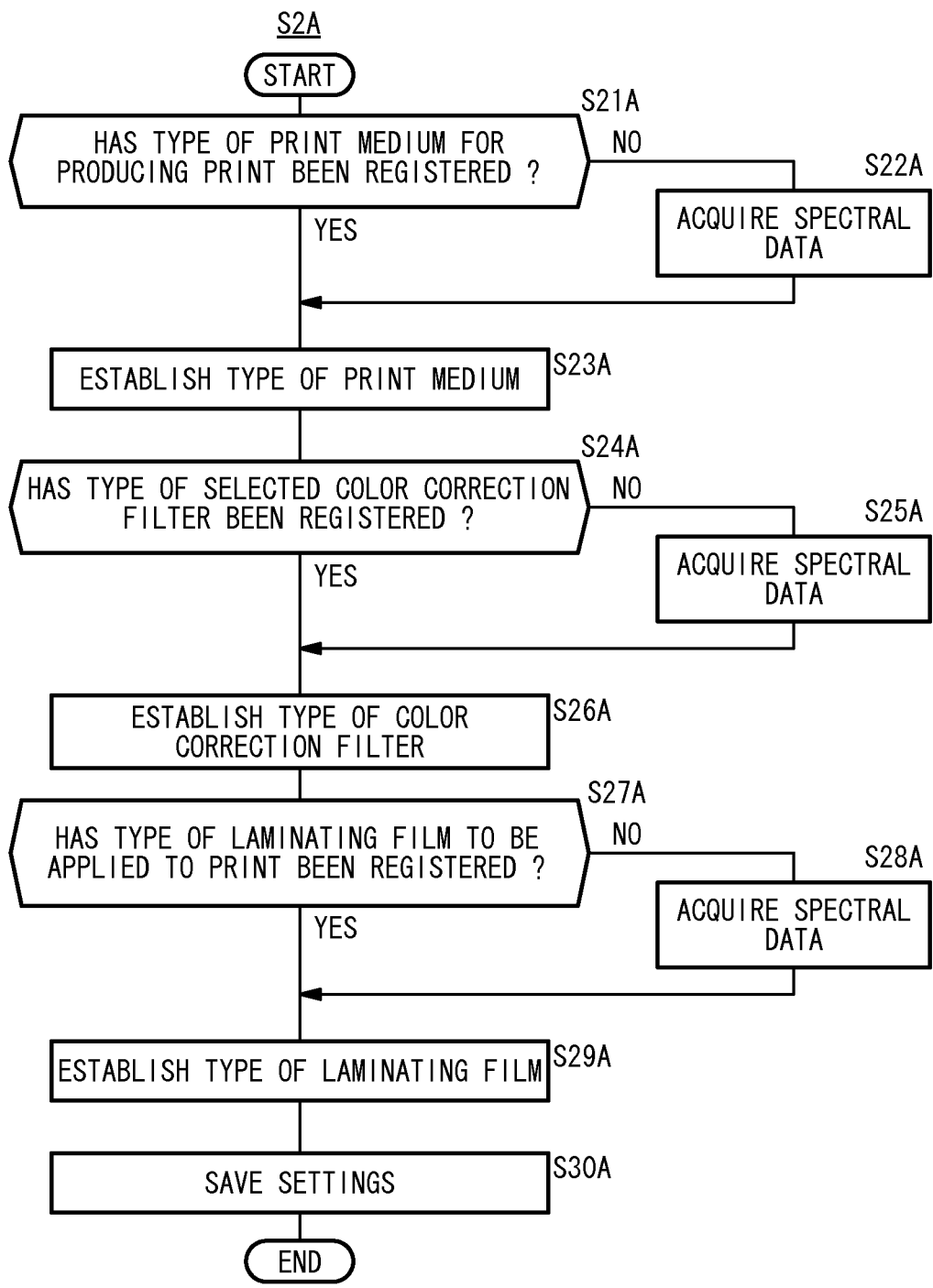

PROFILE GENERATING APPARATUS, PROFILE GENERATING METHOD, COMPUTER-READABLE RECORDING MEDIUM WITH PROFILE GENERATING PROGRAM RECORDED THEREIN, AND PRINTING SYSTEM

CROSS-REFERENCE TO RELATED APPLICATION

This application is based upon and claims the benefit of priority from Japanese Patent Application No. 2009-228582 filed on Sep. 30, 2009, of which the contents are incorporated herein by reference.

BACKGROUND OF THE INVENTION

1. Field of the Invention

The present invention relates to a profile generating apparatus, a profile generating method, a computer-readable recording medium with a profile generating program recorded therein, and a printing system, which are capable of generating a profile for color matching depending on optical characteristics of a protective-film-covered print that carries a color image printed on a print, and which is covered with a protective film.

2. Description of the Related Art

With significant advances in inkjet technology in recent years, it has been become possible for inkjet printers to produce large color prints of high quality at high speeds. Inkjet printers are not only popular for private or home use, but also are widely used in commercial applications nowadays. Inkjet printers make it possible to print on POP (Point Of Purchase) posters, wall posters, large-size mediums such as outdoor advertisements and billboards, roll mediums, and thick hard mediums.

There are a wide variety of print mediums (hereinafter also referred to as "mediums") available for use in prints in order to meet various commercial demands. For example, such print mediums include paper mediums including synthetic paper, thick paper, aluminum-evaporated paper, etc., resin mediums made of vinyl chloride, PET, etc., and tarpaulin paper made of a woven fiber cloth with synthetic resin films applied to both surfaces thereof.

Since advertisement prints are expected to be effective in arousing consumers' motivation to buy advertised products through visual sensation, the finish of colors of the prints is of particular importance. Heretofore, there have been disclosed various color matching technologies, such as a method of generating an ICC (International Color Consortium) profile, a method of adjusting a designated color, etc., as print color managing means.

Advertisement prints are displayed in a variety of places including outdoor areas, indoor areas, and spotlighted exhibition sites. Generally, the spectral characteristics (spectral energy distribution) of environmental light as an observational light source for prints vary depending on different places where the prints are displayed.

Prints are broadly classified as transmissive images using a transmissive light source as a main light source, and as reflective images using a reflective light source as a main light source. Examples of transmissive light sources (i.e., backlighting) include fluorescent lamps such as F2, F6, F7 light sources, LEDs (Light Emitting Diodes), and organic EL (Electro-Luminescence) light sources, etc.

If different observational light sources are used for a print, then since the spectral characteristics of light emitted from different observational light sources and which finally reach the retina of human observers are different, the appearance (color impression) of the print, which is visually perceived by the observer, tends to vary depending on such observational light sources, although the tendency may differ from observer to observer. As a consequence, if the observational environment in which a print is produced, i.e., the location where the printer is installed, and the observational environment in which the print is displayed differ greatly from each other, then the print may possibly fail to exhibit desired colors.

Japanese Laid-Open Patent Publication No. 2007-081586 discloses a method of and an apparatus for independently storing spectral data of a print and a plurality of light source spectral data. A profile appropriate for an observational light source is generated each time that the observational light source is set up. This publication states that the method and apparatus can generate profiles corresponding to respective different observational light sources for colorimetric measurement in a reduced number of man-hours, and can perform appropriate color management for prints depending on such observational light sources.

Prints produced by inkjet printers may not endure in severe environments because the images thereof are not highly durable, particularly in terms of abrasion resistance and toughness.

For example, in exhibition sites that are exposed to high intensity radiant light at all times, color images of displayed prints tend to become gradually discolored because the dyes included in the inks are gradually decomposed by chemical reactions. Also, in display modes where prints are applied to indoor floors, color images of the prints are likely to become damaged because the print surfaces become abraded by people walking on the floors.

Attempts have been made to increase the durability of print images in such applications by covering the image-formed surfaces of prints with protective films such as laminating films, which are functionally treated by the addition of an ultraviolet absorbent, or through an embossing process. A print thus processed will hereinafter be referred to as a "protective-film-covered print".

However, the results of investigation and research conducted by the inventor of the present invention have indicated that, although the laminating film has high transmittance, the spectral transmittance thereof is not necessarily flat within a visible wavelength range, and hence the appearance of printed color images that are covered with the laminating film tends to vary to a non-negligible extent, depending on whether the print is covered with a laminating film or not. It also has been discovered that there are many types of commercially available laminating films, which exhibit different spectral transmittances.

In order to obtain a profile of a protective-film-covered print with the method and the apparatus disclosed in Japanese Laid-Open Patent Publication No. 2007-081586, various prints having various laminating films covering image-formed surfaces thereof (i.e., various protective-film-covered prints) have to be measured colorimetrically. However, if colors are to be strictly reproduced with respect to all combinations of laminating films and prints, then it becomes highly tedious and time-consuming to prepare such samples and to colorimetrically measure them. Further, if characteristics of the laminating films are ignored, then the appearance of printed color images through the laminating films varies, depending on the type of laminating film that is used.

SUMMARY OF THE INVENTION

An object of the present invention is to provide a profile generating apparatus, a profile generating method, a computer-readable recording medium with a profile generating program recorded therein, and a printing system, which are capable of greatly reducing the number of man-hours required to produce a print, to cover the print with a protective film, and to colorimetrically measure the print, without causing a reduction in color reproduction accuracy of the protective-film-covered print.

According to the present invention, there is provided a profile generating apparatus for generating a profile for color matching depending on optical characteristics of a protective-film-covered print, which carries a color image printed on a print and is covered with a protective film, comprising a storage unit for storing spectral data corresponding respectively to a plurality of colors on the print and spectral data of the protective film, an input unit for entering a type of print and a type of protective film, a selector for selecting, from among the spectral data stored in the storage unit, spectral data corresponding to the type of print, which is entered from the input unit as first spectral data, and spectral data corresponding to the type of protective film, which is entered from the input unit as second spectral data, and a calculator for calculating colorimetric values of colors using the first spectral data and the second spectral data, which are selected by the selector. With the above arrangement, the number of man-hours required to generate a profile, specifically, the number of man-hours required to produce a print, to cover the print with a protective film, and to colorimetrically measure the protective-film-covered print are greatly reduced, without lowering color reproduction accuracy of the protective-film-covered print.

Preferably, the profile generating apparatus comprises an acquisition unit for acquiring spectral data of the print or spectral data of the protective film, wherein the storage unit stores the spectral data of the print, which are acquired by the acquisition unit in association with the type of print, and stores the spectral data of the protective film, which are acquired by the acquisition unit in association with the type of protective film. Consequently, not only spectral data of the print and the protective film of types that already have been established, but also spectral data of a print and a protective film of new types, can be stored, so that a profile for each of combinations of prints and protective films of new types can easily be generated.

Preferably, the input unit further enters a type of observational light source, the storage unit further stores spectral data of the observational light source, the selector further selects, from among the spectral data stored in the storage unit, spectral data corresponding to the type of observational light source, which is entered from the input unit as third spectral data, and the calculator calculates colorimetric values of colors also using the third spectral data, which are selected by the selector. Thus, appropriate profiles depending on various observational environments can be generated.

Preferably, the profile generating apparatus further comprises an evaluator for evaluating spectral data of the protective film stored in the storage unit based on spectral data of the observational light source and standard spectral data under standard conditions, and acquiring an evaluation result, and a display device for displaying the evaluation result acquired by the evaluator. With this arrangement, the optical compatibility of the observational light source and the protective film, i.e., differences between colors in the presence and absence of the protective film, can be indicated to the operator in advance, thereby assisting the operator in selecting a protective film enabling better color reproduction accuracy.

According to the present invention, there is also provided a profile generating apparatus for generating a profile for color matching depending on optical characteristics of a print, which carries a color image printed thereon, comprising a storage unit for storing spectral data corresponding respectively to a plurality of colors on the print and spectral data of an observational light source, an input unit for entering a type of print and a type of observational light source, a selector for selecting, from among the spectral data stored in the storage unit, spectral data corresponding to the type of print, which is entered from the input unit as first spectral data, and spectral data corresponding to the type of observational light source, which is entered from the input unit as third spectral data, and a calculator for calculating colorimetric values of colors using the first spectral data and the third spectral data, which are selected by the selector.

Preferably, the profile generating apparatus further comprises a spectral data acquisition unit for acquiring spectral data of the observational light source, wherein the storage unit stores spectral data of the observational light source, which are acquired by the spectral data acquisition unit in association with the type of observational light source. Consequently, not only spectral data of the observational light source of types that have already been established, but also spectral data of new types of observational light sources can be stored, so that a profile for each of combinations of new types of observational light sources can easily be generated.

Preferably, the spectral data acquisition unit comprises a camera, and the profile generating apparatus further comprises an estimator for estimating spectral data of the observational light source based on an image signal captured by the camera in an arrangement including a composite optical filter, which comprises a plurality of optical filters arranged in a two-dimensional pattern and having respective different frequency pass bands, the composite optical filter being disposed between the camera and a white standard board. With this arrangement, spectral data of the observational light source can be acquired in one image capturing process, by an inexpensive system free of an expensive non-contact spectral colorimeter.

Preferably, the input unit further enters a type of color correction optical filter for simulating the observational light source, the storage unit further stores spectral data of the color correction optical filter, the selector further selects, from among the spectral data stored in the storage unit, spectral data corresponding to the type of color correction optical filter, which is entered from the input unit as fourth spectral data, and the calculator calculates colorimetric values of colors also using the fourth spectral data, which are selected by the selector. Consequently, appropriate profiles depending on various observational environments can be generated by combining spectral data, which include not only already entered spectral data of the observational light source, but also spectral data of the color correction optical filter, which simulates the observational light source. In addition, the print color can be adjusted depending on observer preferences, and the print can be reproduced with ease, not only by correcting the observational light source, but also by using the color correction optical filter.

Preferably, the type of print includes an attribute representing a transmissive image or a reflective image, and the calculator changes a process of calculating colorimetric values of colors depending on the attribute. Colorimetric values suitable for various prints can be calculated, thus making it possible to generate a profile with high color reproduction accuracy.

According to the present invention, there is also provided a profile generating method of generating a profile for color matching depending on optical characteristics of a protectivefilm-covered print, which carries a color image printed on a print and is covered with a protective film, comprising the steps of entering a type of print and a type of protective film, selecting, from among spectral data corresponding respectively to a plurality of colors on the print and spectral data of the protective film, spectral data corresponding to the entered type of print as first spectral data, and spectral data corresponding to the entered type of protective film as second spectral data, and calculating colorimetric values of colors using the selected first spectral data and the selected second spectral data.

According to the present invention, there is also provided a computer-readable recording medium recording therein a program for enabling a computer to perform, for generating a profile for color matching, the functions of entering a type of print and a type of protective film, selecting, from among stored spectral data, spectral data corresponding to the entered type of print as first spectral data, and spectral data corresponding to the entered type of protective film as second spectral data, and calculating colorimetric values of colors using the selected first spectral data and the selected second spectral data.

According to the present invention, there further is provided a printing system including a printing machine for printing a color image on a print medium to produce a print, a surface treatment apparatus for covering the print produced by the printing apparatus with a protective film to produce a protective-film-covered print, and a profile generator for generating a profile for color matching depending on optical characteristics of the protective-film-covered print produced by the surface treatment apparatus, the printing system comprising an input unit for entering a type of print and a type of protective film, a storage unit for storing spectral data corresponding respectively to a plurality of colors on the print and spectral data of the protective film, a selector for selecting, from among the spectral data stored in the storage unit, spectral data corresponding to the type of print, which is entered from the input unit as first spectral data, and spectral data corresponding to the type of protective film, which is entered from the input unit as second spectral data, and a calculator for calculating colorimetric values of colors using the first spectral data and the second spectral data, which are selected by the selector.

The profile generating method, the computer-readable recording medium having a program recorded therein, and the printing system make it possible to greatly reduce the number of man-hours required to generate a profile, specifically, the number of man-hours required to print a color chart, to cover the print with a protective film, and to colorimetrically measure the protective-film-covered print, without lowering the color reproduction accuracy of the protective-film-covered print.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 is a functional block diagram of a print profile generator according to the first embodiment;

FIGS. 5A through 5D are views showing by way of example setting images for setting profile generating conditions according to the first embodiment;

FIG. 6 is a flowchart of a sequence for producing an appropriate protective-film-covered print using the printing system according to the first embodiment;

FIG. 7 is a flowchart of a profile generating method according to the first embodiment;

FIG. 15 is a flowchart of a profile generating method according to the second embodiment.

DESCRIPTION OF THE PREFERRED EMBODIMENTS

A profile generating method according to a first embodiment of the present invention, in relation to a profile generating apparatus and a printing system for carrying out the profile generating method, will be described in detail below with reference to FIGS. 1 through 7 of the accompanying drawings.

Figure 1:
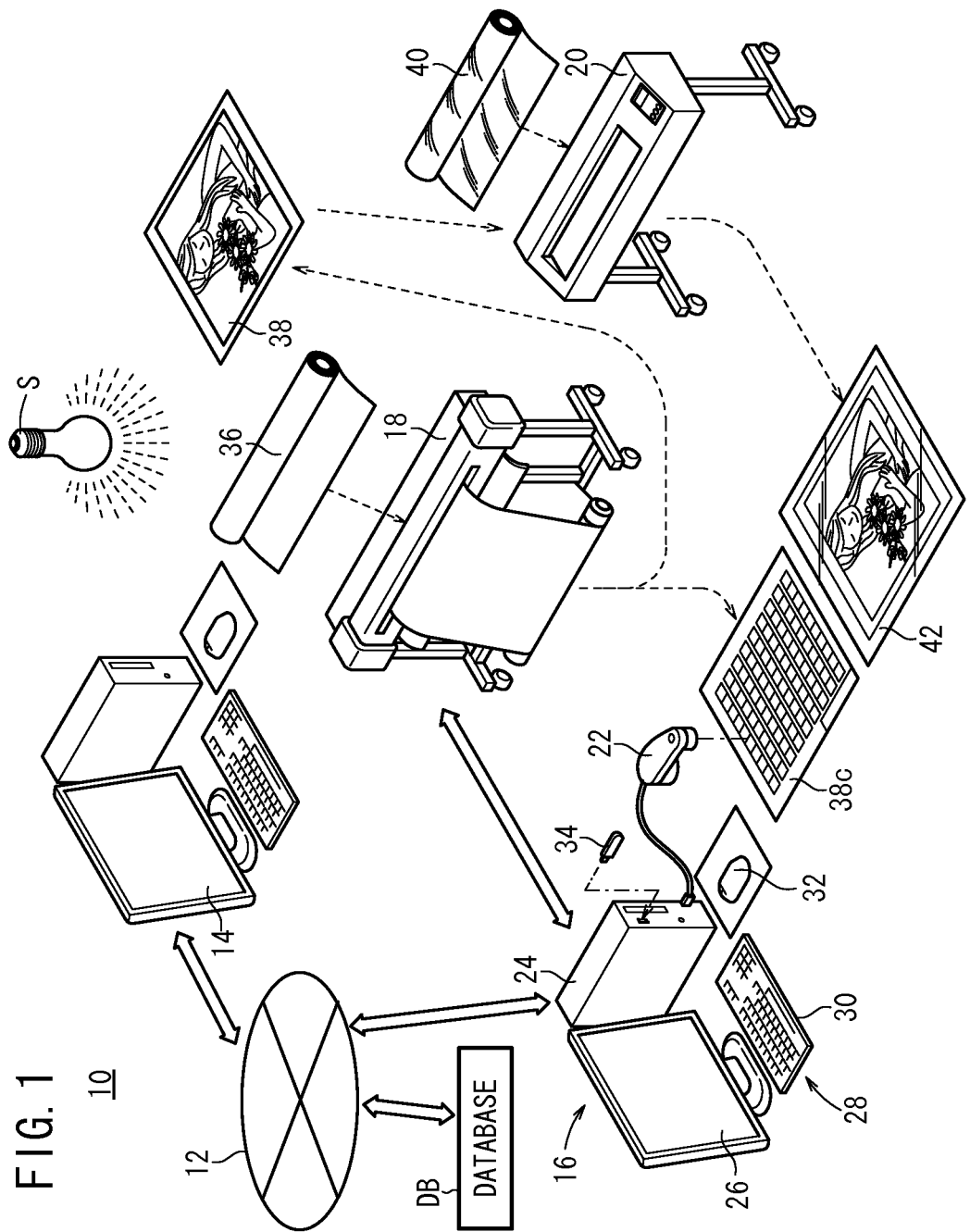
FIG. 1 is a perspective view of a printing system incorporating a profile generating apparatus according to a first embodiment of the present invention.

FIG. 1 shows in perspective a printing system 10 incorporating an image processing apparatus 16 as a profile generating apparatus according to the first embodiment of the present invention.

As shown in FIG. 1, the printing system 10 basically comprises a LAN 12, an editing apparatus 14, an image processing apparatus 16 serving as a profile generating apparatus, a printing machine 18, a laminating apparatus 20 serving as a surface treatment apparatus, and a colorimeter 22 serving as an acquisition unit.

The LAN 12 is a network constructed according to communication standards such as Ethernet (registered trademark) or the like. The editing apparatus 14, the image processing apparatus 16, and a database DB are connected to each other over the LAN 12 by a wired or wireless link.

The editing apparatus 14 is capable of editing an arrangement of color images made up of characters, figures, pictures, photos, etc., on each of pages to be printed. The editing apparatus 14 generates electronic manuscripts in a page description language (hereinafter referred to as "PDL"), e.g., 8-bit image data in color channels consisting of four colors (C, M, Y, K) or three colors (R, G, B).

PDL refers to a language that is descriptive of image information, including format information, positional information, color information (including density information), etc., of characters, figures, etc., in a "page" that serves as an output unit for printing, displaying, or the like. Known types of PDL include PDF (Portable Document Format according to ISO32000-1:2008), PostScript (registered trademark) of Adobe Systems Incorporated, and XPS (XML Paper Specification).

A color scanner, not shown, is connected to the editing apparatus 14. The color scanner is capable of optically reading a color original, which is set in position. Therefore, the editing apparatus 14 can acquire color image data in the form of an electronic manuscript from the color scanner based on the color original read thereby.

The image processing apparatus 16 converts the color image data of an electronic manuscript described by PDL and acquired from the editing apparatus 14 into bitmap image data (a type of raster image data), and then performs a desired image processing process, e.g., a color conversion process, an image scaling process, an image arranging process, etc., on the bitmap image data, converts the processed bitmap image data into a print signal that matches the printing process of the printing machine 18, and sends the print signal to the printing machine 18.

The image processing apparatus 16 comprises a main unit 24 including a CPU, a memory, etc., a display device 26 for displaying color images, and an input device 28 as an input unit including a keyboard 30 and a mouse 32. A portable memory 34, which is capable of freely recording and erasing electronic data, and the colorimeter 22 are connected to the main unit 24 of the image processing apparatus 16.

The printing machine 18 comprises an inkjet printing apparatus for producing a color image based on a combination of standard inks of colors C, M, Y, K (process colors) and optional inks of light colors such as LC, LM, etc., and W (white). The printing machine 18 controls propulsion of inks onto a print medium 36 (a rolled non-printed medium as shown in FIG. 1) based on print signals received from an external apparatus, e.g., the image processing apparatus 16, in order to print a color image on the print medium 36, thereby producing a print 38, which may include a color chart 38c.

The laminating apparatus 20 applies a laminating film 40 as a protective film to the image-formed surface of the print 38 and, if necessary, to the reverse surface thereof. The laminating apparatus 20 then heats and presses the laminating film 40 onto the print 38 with a heating roller, not shown, thereby producing a protective-film-covered print 42 in which the image-formed surface of the print 38 is protected by the laminating film 40.

The print medium 36 may comprise a paper medium such as synthetic paper, thick paper, aluminum-evaporated paper or the like, a resin medium such as vinyl chloride, PET or the like, or tarpaulin paper or the like. The protective film, which is applied to the print 38, is not limited to a laminating film 40, but may be formed from a liquid, a varnish, a transparent ink, a clear toner or the like, or may comprise a protective sheet such as an acrylic sheet or the like.

The colorimeter 22 measures colorimetric values of an object to be measured. Colorimetric values refer not only to tristimulus values X, Y, Z, the coordinates L*, a*, b* of a uniform color space, etc., but also to a distribution of optical physical values (hereinafter referred to as "spectral data") with respect to wavelengths, e.g., a spectral radiance distribution, a spectral sensitivity distribution, spectral reflectivity, or spectral transmittance.

The protective-film-covered print 42 produced by the laminating apparatus 20 is displayed at a given site under a light source S, which serves as an observational light source.

Figure 2:
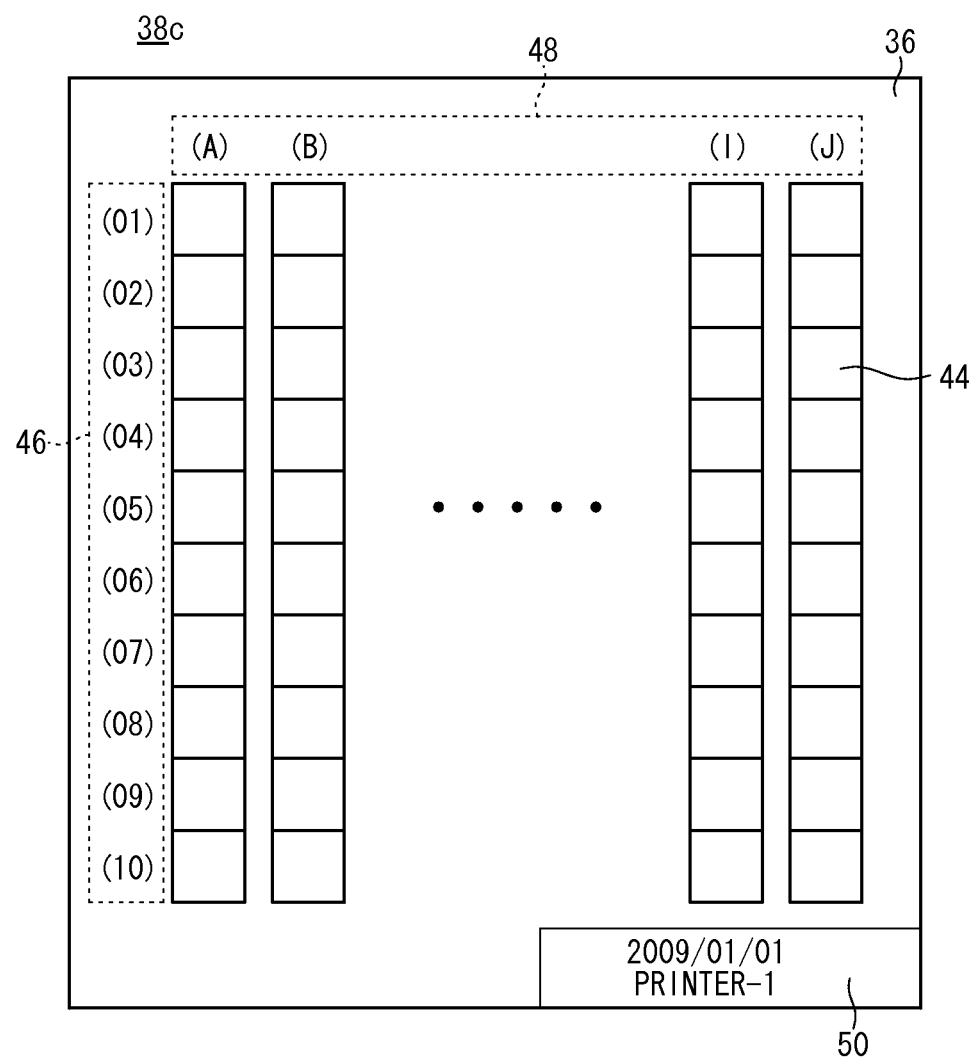
FIG. 2 is a front elevational view of a color chart according to the first embodiment.

FIG. 2 is a front elevational view of the color chart 38c according to the first embodiment.

The color chart 38c shown in FIG. 2 comprises one hundred color patches 44 of different colors, which are substantially identical in shape and arranged in rows and columns, a sequence of numbers 46 and a sequence of alphabetical letters 48 for identifying positions of the color patches 44 along directions of the rows and columns, and print information 50 for identifying conditions for printing the color chart 38c, all of which is printed on the print medium 36.

The color patches 44 are arranged in a matrix having 10 vertical columns and 10 horizontal rows, the color patches 44 being spaced from each other by given intervals. Colors of the respective color patches 44 are set to given values within a range of signal levels of C, M, Y, K values (a percentage range from 0% to 100% or an 8-bit gradation range from 0 to 255).

The sequence of numbers 46 represents a vertical string of characters ranging from (01) to (10) positioned in alignment with and to the left of respective rows of color patches 44. The sequence of alphabetical letters 48 represents a horizontal string of characters ranging from (A) to (J) positioned in alignment with and at the top of respective columns of color patches 44.

The print information 50 is printed on the print medium 36 and represents the type and serial number, or a registered name of the printing machine 18, a print mode (to be described later), the type of print medium 36, a print date, etc.

Figure 3:
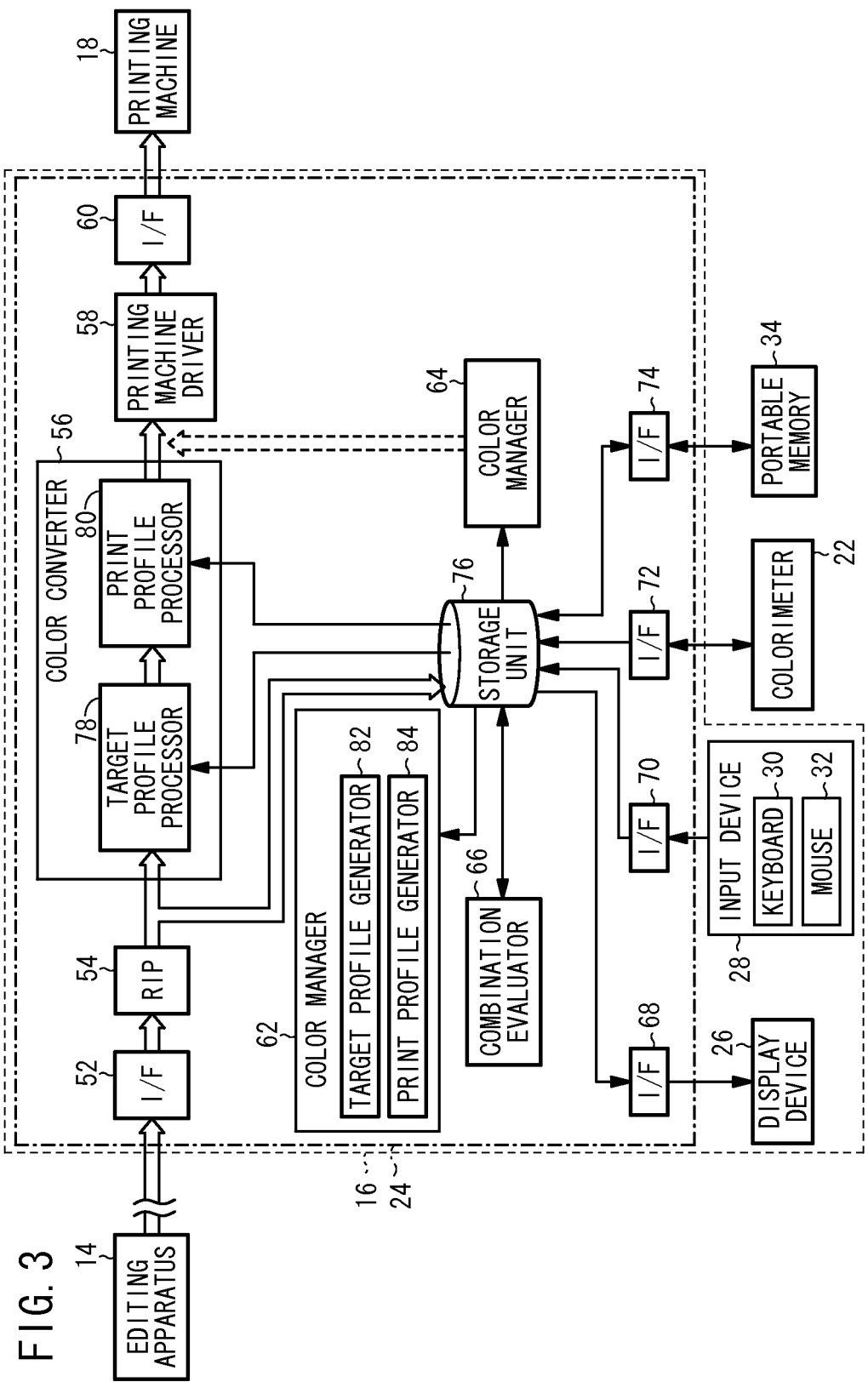
FIG. 3 is a functional block diagram of the profile generating apparatus according to the first embodiment.

FIG. 3 is a functional block diagram of the image processing apparatus 16 according to the first embodiment. In FIG. 3, an electronic manuscript is supplied along directions indicated by the outlined solid-line arrows, color-chart image data is supplied along directions indicated by the outlined broken-line arrows, and various other data is supplied along directions indicated by the solid-line arrows.

As shown in FIG. 3, the main unit 24 of the image processing apparatus 16 includes an I/F 52 for entering an electronic manuscript supplied from the editing apparatus 14, a RIP (Raster Imaging Processor) 54 for converting the PDL format of the electronic manuscript supplied from the I/F 52 into a bitmap format, a color converter 56 for performing a color conversion process on the converted C, M, Y, K values (or R, G, B values) of the electronic manuscript from the RIP 54 in order to produce image data of new C, M, Y, K values, a printing machine driver 58 for converting the image data of the new C, M, Y, K values produced by the color converter 56 into print signals (ink propulsion control data) that match the printing process of the printing machine 18, and another I/F 60 for outputting the print signals generated by the printing machine driver 58 to the printing machine 18.

The main unit 24 also includes a color manager 62 for managing profiles for different printing machines 18, an image data generator 64 for generating image data to print the color chart 38c, a combination evaluator (evaluator) 66 for quantitatively evaluating whether the combination of the type of light source S and the laminating film 40 is acceptable or not based on the spectral data of the light source S and the laminating film 40, an I/F 68 connected to the display device 26, an I/F 70 connected to the input device 28 including the keyboard 30 and the mouse 32, an I/F 72 connected to the colorimeter 22, and an I/F 74 connected to the portable memory 34.

The main unit 24 also includes a storage unit 76 for storing various data supplied from various components of the main unit 24, and for supplying the stored data to various components of the main unit 24. The storage unit 76 is connected to the RIP 54, the color converter 56, the color manager 62, the image data generator 64, the combination evaluator 66, the I/F 68, the I/F 70, the I/F 72, and the I/F 74.

The color converter 56 comprises a target profile processor 78 for converting device-dependent data into device-independent data, and a print profile processor 80 for converting device-independent data into device-dependent data. Device-dependent data refer to data defined in terms of C, M, Y, K values, R, G, B values, or the like, for appropriately driving various devices. Device-independent data refer to data defined in terms of a display system, such as an HSV (Hue-Saturation-Value) system, an HLS (Hue-Lightness-Saturation) system, a CIELAB system, a CIELUV system, an XYZ system, or the like.

The color manager 62 comprises a target profile generator 82 for generating target profiles for respective printing machines 18, and a print profile generator 84 for generating print profiles for respective printing machines 18.

The RIP 54 can perform various image processing processes, including an image scaling process depending on resolution, etc., of the printing machine 18, and a rotating and inverting process depending on a printing format utilized when an electronic manuscript is converted into bitmap image data.

From the C, M, Y, K values, the printing machine driver 58 generates ink propulsion control data corresponding to ink colors (C, M, Y, K, LC, LM, or W). The ink propulsion control data are related to operational details of the printing machine 18, which serve to eject the inks (ink ejection ON/OFF, ink dot diameters, etc.) according to data definitions inherent in the printing machine 18. The printing machine driver 58 may generate ink propulsion control data according to a known algorithm, such as a dither matrix method, an error diffusion method, or the like, although conversion is required from an 8-bit multiple-gradation image into a low-gradation image such as a binary image.

The target profile processor 78 or the print profile processor 80 is capable of correcting a profile depending on a print mode of the printing machine 18. The print mode refers to various print settings, such as the number of nozzles of the print head, the timing (unidirectional/bidirectional) of ink ejection during scanning of the print head, the number of passes, the number and type of inks used in the printing machine 18, and an algorithm for generating ink ejection control data, etc.

The main unit 24 has a controller (not shown) comprising a CPU, etc., for controlling all of the image processing processes described above. More specifically, the controller controls not only operation of various components of the main unit 24, e.g., reading data from and writing data to the storage unit 76, but also transmission of display signals via the I/F 68 to the display device 26, and acquisition of colorimetric data from the colorimeter 22 via the I/F 72.

The image processing apparatus 16 according to the first embodiment is constructed as described above. Image processing processes or other functions described above can be performed according to application programs, which are stored in the storage unit 76, and which operate under the control of a basic program (operating system).

FIG. 4 is a functional block diagram of the print profile generator 84 according to the first embodiment.

The print profile generator 84 basically comprises a data selector (selector) 86, a colorimetric value calculator (calculator) 88, and a LUT generator 90.

The data selector 86 selects spectral data of a print medium under profile generating conditions (hereinafter referred to as "first spectral data 112"), spectral data of a laminating film (hereinafter referred to as "second spectral data 114"), and spectral data of an observational light source (hereinafter referred to as "third spectral data 116"), based on setting data 100, a group 102 of spectral data of print mediums under profile generating conditions, a group 104 of laminating film spectral data, and a group 106 of spectral data of observational light sources. The setting data 100 represent types of print mediums 36, laminating films 40, and types of light sources S that are set (input) by the operator, and which serve as setting data relative to the profile generating conditions.

The colorimetric value calculator 88 calculates colorimetric value data 120 under profile generating conditions based on the first, second, and third spectral data 112, 114, 116, which are selected by the data selector 86 according to a color matching function (spectral data in view of visual characteristics of a standard observer), not shown.

The LUT generator 90 generates a LUT 124 under profile generating conditions based on the colorimetric value data 120 calculated by the colorimetric value calculator 88, and C, M, Y, K value data 122 corresponding to the respective color patches 44 (see FIG. 2).

In the present embodiment, spectral data are given respectively in association with one hundred color patches 44 whose patch numbers range from 0 to 99. The light wavelengths have nine data $\lambda_1$ through $\lambda_9$ associated therewith. For example, the light wavelengths are represented by $\lambda_1$=400 nm, ..., $\lambda_9$=800 nm at intervals of 50 nm.

FIGS. 5A through 5D are views showing by way of example setting images for setting profile generating conditions according to the first embodiment.

FIG. 5A shows a setting image 130 having three pull-down menus 132, 134, 136, a textbox 138, and buttons 140, 142 labeled "GENERATE" and "CANCEL", respectively, arranged successively downward.

The setting image 130 includes a string of letters indicating "PRINT MEDIUM" on the left side of the pull-down menu 132. When the operator operates the mouse 32 in a certain way, a selection column 144 also is displayed beneath the pull-down menu 132, as shown in FIG. 5B, with a scroll bar 146 added to the right side of the selection column 144.

The setting image 130 includes a string of letters indicating "LAMINATING FILM" on the left side of the pull-down menu 134. When the operator operates the mouse 32 in a certain way, a selection column 148 also is displayed beneath the pull-down menu 134, as shown in FIG. 5C, with a scroll bar 150 added to the right side of the selection column 148.

The setting image 130 includes a string of letters indicating "LIGHT SOURCE" on the left side of the pull-down menu 136. When the operator operates the mouse 32 in a certain way, a selection column 152 also is displayed beneath the pull-down menu 136, as shown in FIG. 5D, with a scroll bar 154 added to the right side of the selection column 152.

The setting image 130 includes a string of letters indicating "PROFILE NAME" on the left side of the textbox 138. The operator can enter character information into the textbox 138 through operation of the keyboard 30.

The printing system 10 according to the first embodiment basically is constructed as described above. Operations of the printing system 10 will be described below.

FIG. 6 is a flowchart of a sequence for producing an appropriate protective-film-covered print 42 using the printing system 10 according to the first embodiment. A process for producing the protective-film-covered print 42 will be described below, mainly with reference to FIGS. 1 and 6.

The operator examines printing conditions and observational manners of a protective-film-covered print 42 to be produced (step S1). Such printing conditions refer to the type of printing machine 18 that is used to produce the protectivefilm-covered print 42, the type of print medium 36, the type of laminating film 40, and the print mode referred to above, etc. Observational manners refer to spectral data of the light source S, and the manner in which the protective-film-covered print 42 is displayed (reflection, transmission, or a combination thereof).

Then, the operator selects a profile suitable for the printing machine 18 (step S2). Normally, a target profile or a print profile is stored in the storage unit 76 of the main unit 24 (see FIG. 3). If a profile suitable for the printing machine 18 has not been registered, i.e., is not stored in the storage unit 76, then a print profile can be generated separately.

Then, an electronic manuscript is printed using the printing machine 18, thereby producing a print 38 (step S3). Thereafter, the print 38 is laminated (step S4).

More specifically, the laminating film 40 is applied to the image-formed surface of the print 38 and, if necessary, the reverse surface thereof. The laminating film 40 then is heated and pressed by a heating roller of the laminating apparatus 20, thereby producing a protective-film-covered print 42. The produced protective-film-covered print 42 has an increased level of abrasion resistance and toughness.

Then, the operator evaluates the color image of the protective-film-covered print 42 (step S5), and determines whether or not the color of the color image is appropriate (step S6). The operator may evaluate the color of the color image in order to determine whether desired hues are obtained, either by visually checking the color image based on observation of an overall or partial appearance of the color image, or by obtaining a colorimetric value of a certain area of the protective-film-covered print 42 with the colorimeter 22, and determining whether or not the obtained colorimetric value falls within a desired range.

If, as a result of such image evaluation, the operator judges that the color of the color image of the protective-film-covered print 42 is not suitable, then the operator changes the profile in order to make fine adjustments to the color of the color image (step S7). More specifically, the operator may reset or regenerate the profile, or may make fine adjustments to the profile, i.e., may correct the presently set profile.

Thereafter, an electronic manuscript is printed and colors of the color image itself are evaluated repeatedly (steps S3 through S7) until a protective-film-covered print 42 having a desired color is obtained.

An image processing sequence of the image processing apparatus 16 for printing an electronic manuscript (step S3) will be described in detail below with reference to FIG. 3.

When an electronic manuscript in PDL format supplied from the editing apparatus 14 is input to the image processing apparatus 16 via the LAN 12 and the I/F 52, the electronic manuscript is converted into 8-bit C, M, Y, K bitmap data (device-dependent image data) by the RIP 54. Such 8-bit C, M, Y, K bitmap data are then converted into L*, a*, b* data (device-independent image data) by the target profile processor 78. Such L*, a*, b* data are then converted into C, M, Y, K value data (device-dependent image data) by the print profile processor 80. The C, M, Y, K value data are then converted into a print signal (ink ejection control data) by the printing machine driver 58. The print signal is supplied to the printing machine 18 from the printing machine driver 58 via the I/F 60. Thereafter, the printing machine 18 produces a desired print 38 based on the print signal.

Since target profiles and print profiles corresponding to a plurality of set conditions have been stored in the storage unit 76, a target profile and a print profile are supplied selectively to the target profile processor 78 and the print profile processor 80, depending on various preset conditions. If such profiles are appropriately corrected in view of the print mode of the printing machine 18, then more appropriate color conversion processes can be performed.

The flowchart shown in FIG. 6, for producing an appropriate protective-film-covered print 42 with the printing system 10 according to the first embodiment, has been described above. A process for generating a profile (step S2) will be described in detail below with reference to the flowchart shown in FIG. 7.

The operator confirms whether or not the type of print medium 36 used for producing the print 38 has been registered (step S21).

If not yet registered, then spectral data of the print medium 36 are acquired (step S22). For example, the operator prepares the portable memory 34, which stores spectral data of the print medium 36 therein, and connects the portable memory 34 to the main unit 24 of the image processing apparatus 16. Spectral data stored in the portable memory 34 are automatically or manually transferred as new data to the storage unit 76. Alternatively, spectral data of the print medium 36 may be managed by the database DB (see FIG. 1) and, if necessary, acquired therefrom and transferred to the storage unit 76.

Further, alternatively, spectral data of the print medium 36 may be acquired directly from the print medium 36 using the colorimeter 22, which is connected to the main unit 24. A process of directly acquiring spectral data of the print medium 36 using the colorimeter 22 will be described, mainly with reference to FIG. 3.

The operator enters a request to print the color chart 38c into a setting image (not shown), which is displayed on the display device 26. In response to the request, the image data generator 64 of the main unit 24 generates image data (C, M, Y, K values) for printing the color chart 38c, and supplies the generated image data to the printing machine driver 58. The printing machine driver 58 then converts the image data into a print signal, which is supplied to the printing machine 18 in the same manner as when an electronic manuscript is printed. In response to the print signal, the printing machine 18 prints the color chart 38c (see FIG. 2).

The C, M, Y, K value data 122 (see FIG. 4), which correspond to pixels of the respective color patches 44, are stored in the storage unit 76 in advance, and are read from the storage unit 76 when the image data generator 64 generates image data.

The operator measures spectral data of the color patches 44 that make up the color chart 38c (see FIG. 2) using the colorimeter 22, which is connected to the image processing apparatus 16. At this time, the laminating apparatus 20 does not perform the laminating process. It is preferable for the sequence for colorimetrically measuring the color patches 44, e.g., (01) through (10) on column (A) and (01) through (10) on column (B), to be determined in advance using the numbers 46 and the alphabetical letters 48 shown in FIG. 2. When the operator has completed the colorimetric measurement, the spectral data corresponding to the color patches 44 are saved in the storage unit 76 via the I/F 72, in relation to the type of print medium 36 (see FIG. 3).

After spectral data have been saved in the storage unit 76, a new type of print media 36 can be selected from the selection column 144 of the pull-down menu 132 shown in FIG. 5B. In FIG. 5B, "PVC A" (where "PVC" refers to polyvinyl chloride") is selected.

In FIG. 5B, the pull-down menu 132 allows the operator to select different types of print media 36 only. However, the pull-down menu 132 may also be arranged so as to allow the operator to select certain types of prints 38. For example, the pull-down menu 132 may be arranged so as to allow the operator to select a type of print 38 in combination with print modes of the printing machine 18, or attributes (transmissive/reflective images) of the print medium 36.

The term "transmissive image" refers to an image observed with a transmissive light source (backlight) used as a main light source, and is printed on a transmissive medium that exhibits a relatively high light transmittance. The term "reflective image" refers to an image that is observed with a reflective light source used as a main light source.

The type of print medium 36 is thus established (step S23).

The operator then confirms whether or not the type of laminating film 40 to be applied to the print 38 has been registered (step S24). If not yet registered, then spectral data of the laminating film 40 are acquired (step S25). The portable memory 34 may store spectral data of the laminating film 40, and the operator may acquire spectral data of the laminating film 40 from the portable memory 34.

After spectral data have been saved in the storage unit 76, a new type of laminating film 40 can be selected from the selection column 148 of the pull-down menu 134 shown in FIG. 5C. In FIG. 5C, "MATT B" (where "MATT" refers to a non-glossy film) is selected.

The type of laminating film 40 is thus established (step S26).

The operator then confirms whether or not the type of observational light source S has been registered (step S27). If not yet registered, then spectral data of the light source S are acquired (step S28). The portable memory 34 may store spectral data of the light source S, and the operator may acquire spectral data of the light source S from the portable memory 34.

After spectral data have been saved in the storage unit 76, a new type of light source S can be selected from the selection column 152 of the pull-down menu 136 shown in FIG. 5D. In FIG. 5D, a light source "A" is selected.

The type of observational light source S is thus established (step S29).

When selecting a type of laminating film 40, the operator may refer to evaluation results for compatibility with the observational light source made by the combination evaluator 66 (see FIG. 3). A specific evaluation process carried out by the combination evaluator 66 will be described below with respect to the print 38 (or the protective-film-covered print 42), which carries a reflective image.

First, standard spectral data in a standard environment (e.g., in the printing system 10) are established in advance. For example, if it is assumed that a standard light source (D50) has a spectral radiation distribution $E_{STD}(\lambda_i)$, and that the spectral transmittance in the absence of the laminating film 40 is indicated by $T_{STD}(\lambda_i)=1$, then the standard spectral data is represented by $E_{STD}(\lambda_i) \times T^2_{STD}(\lambda_i) = E_{STD}(\lambda_i)$.

Then, spectral data within a given observational environment are calculated. For example, if it is assumed that the light source S has a spectral radiation distribution $E(\lambda_i)$, and that the laminating film 40 to be applied to the print 38 has a spectral transmittance given by $T(\lambda_i)$, then the spectral data, which results from the observational light source and the laminating film 40, is calculated as $E(\lambda_i) \times T^2(\lambda_i)$.

Thereafter, an error in the spectral data at each wavelength is evaluated. An error function $f_1(T)$, which is indicative of an error of the calculated spectral data from the standard spectral data, is expressed by equation (1) shown below. Both spectral data are divided by $E_{STD}(\lambda_i)$ in order to standardize the standard spectral data to 1 at all times.

$$f_1(T) = \sum_{i=1}^{9} \left\{ 1 - \frac{E(\lambda i)}{E_{STD}(\lambda i)} T^2(\lambda i) \right\}^2 \quad (1)$$

The spectral transmittance $T(\lambda_i)$ in equation (1) is selected from the known group 104 of laminating film spectral data. A laminating film 40 having a spectral transmittance $T(\lambda_i)$ that reduces the error function $f_1(T)$ is estimated as being highly optically compatible with the light source S, whereas a laminating film 40 having a spectral transmittance $T(\lambda_i)$ that increases the error function $f_1(T)$ is estimated as being poorly optically compatible with the light source S.

The reasons for the above estimation result from the fact that, since an algorithm for generating a profile (particularly the LUT 124) typically is designed to reproduce colors appropriately in the standard environment, profiles that are generated using spectral data more similar to the standard spectral data have a higher color reproduction capability.

Similarity between the calculated spectral data and the standard spectral data may be evaluated by means of a process for calculating a correlation coefficient.

In this manner, second spectral data (spectral transmittance $T(\lambda_i)$) can be selected from the known group 104 (see FIG. 4) of laminating film spectral data.

Finally, profile generating conditions including the type of print medium 36 established in step S23, the type of laminating film 40 established in step S26, and the type of light source S established in step S29 are saved (step S30).

After a profile name to be generated has been entered and registered in the textbox 138 shown in FIG. 5A, the operator presses the "GENERATE" button 140. Various settings (setting data 100) are now input through the input device 28 to the main unit 24, whereupon such data are automatically stored in the storage unit 76.

Thereafter, as shown in FIG. 4, the first, second, and third spectral data 112, 114, 116, which are associated with the setting data, are selected by the data selector 86, from among the setting data 100 supplied from the storage unit 76, the group 102 of spectral data of print mediums, the group 104 of laminating film spectral data, and the group 106 of spectral data of observational light sources. Then, the colorimetric value calculator 88 calculates colorimetric value data 120 under profile generating conditions based on the first, second, and third spectral data 112, 114, 116.

The colorimetric value data 120 under the profile generating conditions represent coordinates L*, a*, b*, which are estimated based on measured data at a time when the protective-film-covered print 42 is observed under the light source S.

More specifically, tristimulus values X, Y, Z of the color patches 44 correspond to values, which are produced by multiplying the spectral radiation distribution of the light source S, the square of the spectral transmittance of the laminating film 40, the spectral reflectivity of the print 38, and the color matching function, and integrating the product within a range of visible wavelengths. Coordinates L*, a*, b* of the color patches 44 are calculated according to a given function as colorimetric value data 120, based on the tristimulus values X, Y, Z.

If the laminating film 40 is glossy (i.e., the laminating film 40 has a high surface gloss level), then the coordinates L*, a*, b* can be calculated highly accurately by the above process, i.e., by multiplication of the square of the spectral transmittance. However, if the laminating film 40 is matt (i.e., the laminating film 40 has a low surface gloss level), the coordinates L*, a*, b* cannot be calculated accurately by the above process, because the effect of scattered light produced in the laminating film 40 is not negligible.

Therefore, if the laminating film 40 is matt, it is preferable to rely on a process that takes light scattering into account. For example, such a process may employ various optical properties, including specific reflectivity, a scattering coefficient, an absorbing coefficient, etc., as spectral data of the laminating film 40.

If the print medium 36 is transmissive, then the tristimulus values X, Y, Z of the color patches 44 can be calculated highly accurately by multiplying the spectral radiation distribution of the light source S, the spectral transmittance of the laminating film 40, the spectral transmittance of the print 38, and the color matching function, and by integrating the product within the range of visible wavelengths.

Therefore, preferably, different processes are used to calculate colorimetric values of the color patches 44, depending on the type of print 38 (e.g., an attribute representative of a reflective/transmissive image, and optical properties of the laminating film 40), because such processes are more capable of calculating the colorimetric values with high accuracy.

According to the present embodiment, since one hundred color patches 44 are measured, one hundred sets of coordinates L*, a*, b* are obtained.

The LUT generator 90 generates a lookup table LUT 124 for converting the three-dimensional data (L*, a*, b*) of the print profile into four-dimensional data (C, M, Y, K), based on an association between one hundred sets of colorimetric value data 120 (L*, a*, b*) and one hundred sets of C, M, Y, K value data 122.

With the above arrangement, once spectral data of the print medium 36, the laminating film 40, and the light source S have been acquired, a print profile can be estimated without the need for producing a protective-film-covered print 42 itself. Accordingly, the number of the series of processes for generating a profile, including printing of the color chart 38c by the printing machine 18 (including a wait time), the laminating process carried out by the laminating apparatus 20, and colorimetric measurement using the colorimeter 22, can be reduced.

For example, if the print medium 36 is available in $N_1$ types, the laminating film 40 in $N_2$ types, and the light source S in $N_3$ types, then a conventional profile generating method has required ($N_1 \times N_2$) separate printing and laminating processes, and ($N_1 \times N_2 \times N_3$) separate colorimetric measurement processes. According to the present invention, the profile generating method requires no laminating processes, and only $N_1$ printing and colorimetric measurement processes. Therefore, the profile generating method according to the present invention is more advantageous, in that the total number of types $N_1$, $N_2$, $N_3$ is greater.

Print profiles corresponding to profile generating conditions are stored in the storage unit 76 (see FIG. 3). When there is a request for printing an electronic manuscript, the stored print profiles are read selectively from the storage unit 76. Since a print profile, having once been generated, does not need to be generated again, the processing time required for image processing is shortened.

Alternatively, each time a request is made for printing an electronic manuscript, a print profile corresponding to print setting conditions may be generated and supplied to the color converter 56. In this manner, the amount of data stored in the storage unit 76 can be reduced.

A profile generating method according to a second embodiment of the present invention, in relation to a profile generating apparatus and a printing system for carrying out the profile generating method, will be described in detail below with reference to FIGS. 8 through 15 of the accompanying drawings.

Parts of the second embodiment, which are identical to those of the first embodiment, are denoted by identical reference characters, and such features will not be described in detail below.

Figure 8:
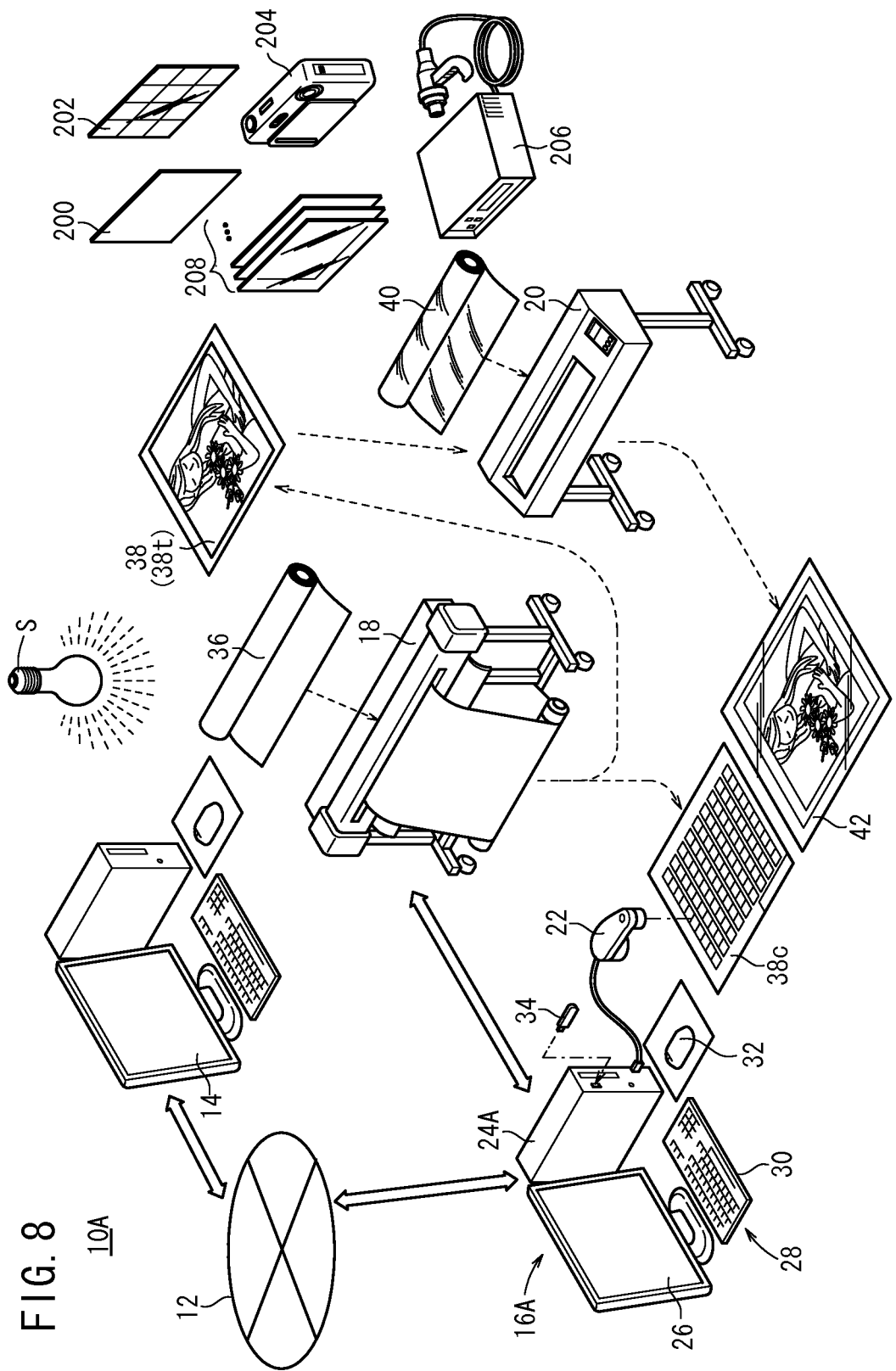
FIG. 8 is a perspective view of a printing system incorporating a profile generating apparatus according to a second embodiment of the present invention.

FIG. 8 is a perspective view of a printing system 10A incorporating an image processing apparatus 16A as a profile generating apparatus according to the second embodiment of the present invention.

As shown in FIG. 8, the printing system 10A comprises components identical to those of the printing system 10 according to the first embodiment, while also including a white reference board 200, a composite filter (composite optical filter) 202, a digital camera (spectral data acquisition unit, camera) 204, a non-contact colorimeter (spectral data acquisition unit) 206, and a plurality of color correction filters (color correction optical filters) 208.

Figure 9:
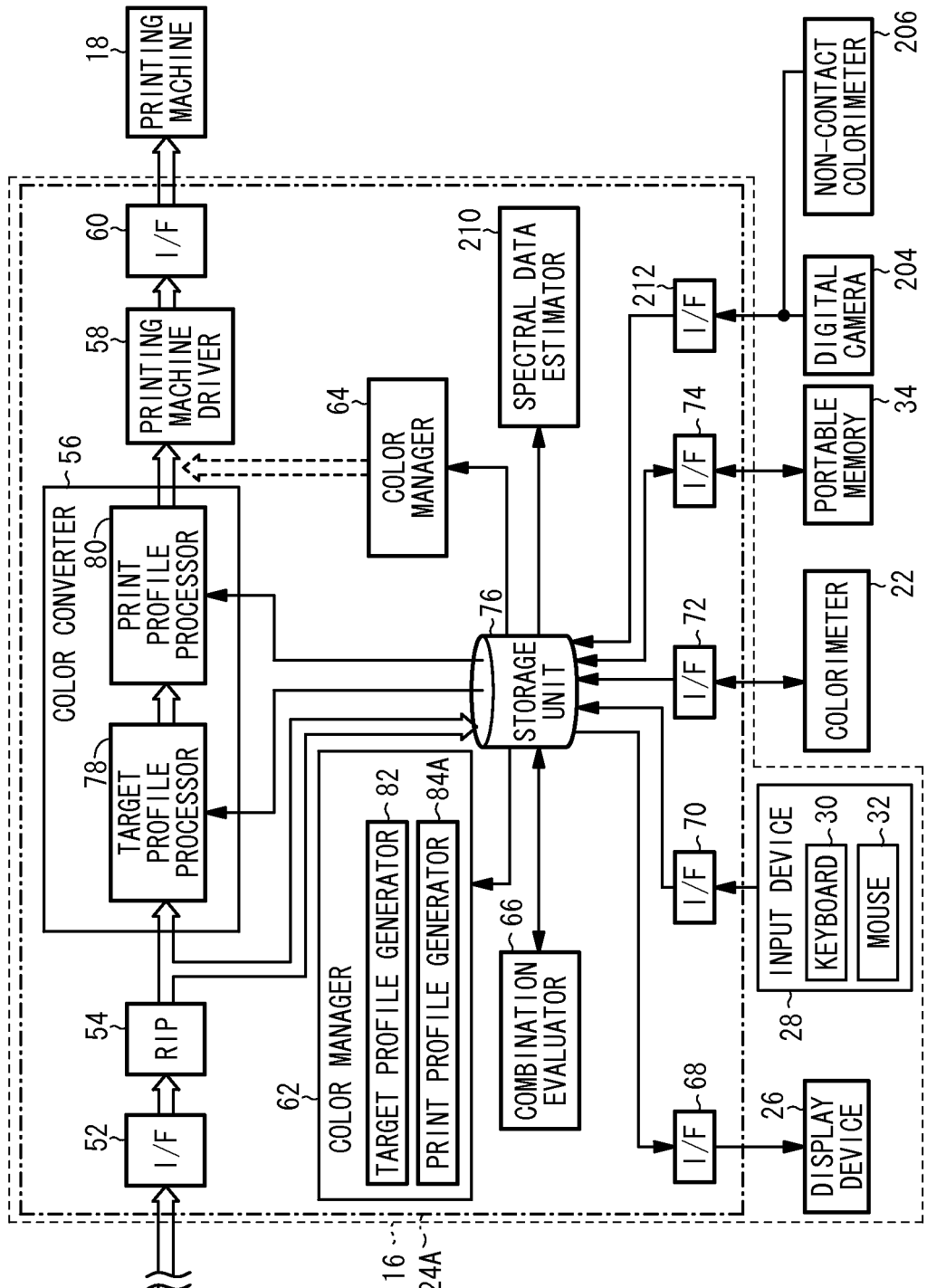
FIG. 9 is a functional block diagram of the profile generating apparatus according to the second embodiment.

FIG. 9 is a functional block diagram of the image processing apparatus 16 according to the second embodiment.

The image processing apparatus 16 includes a main unit 24A, which comprises components identical to those of the main unit 24 according to the first embodiment, while additionally including a spectral data estimator (estimator) 210 for estimating spectral data of the light source S based on captured image data of the composite filter 202, to be described in detail later, and an I/F 212. The digital camera 204 for acquiring captured image data of the composite filter 202, and the non-contact colorimeter 206 for acquiring spectral data of the light source S, can be connected to the I/F 212.

Figure 10:
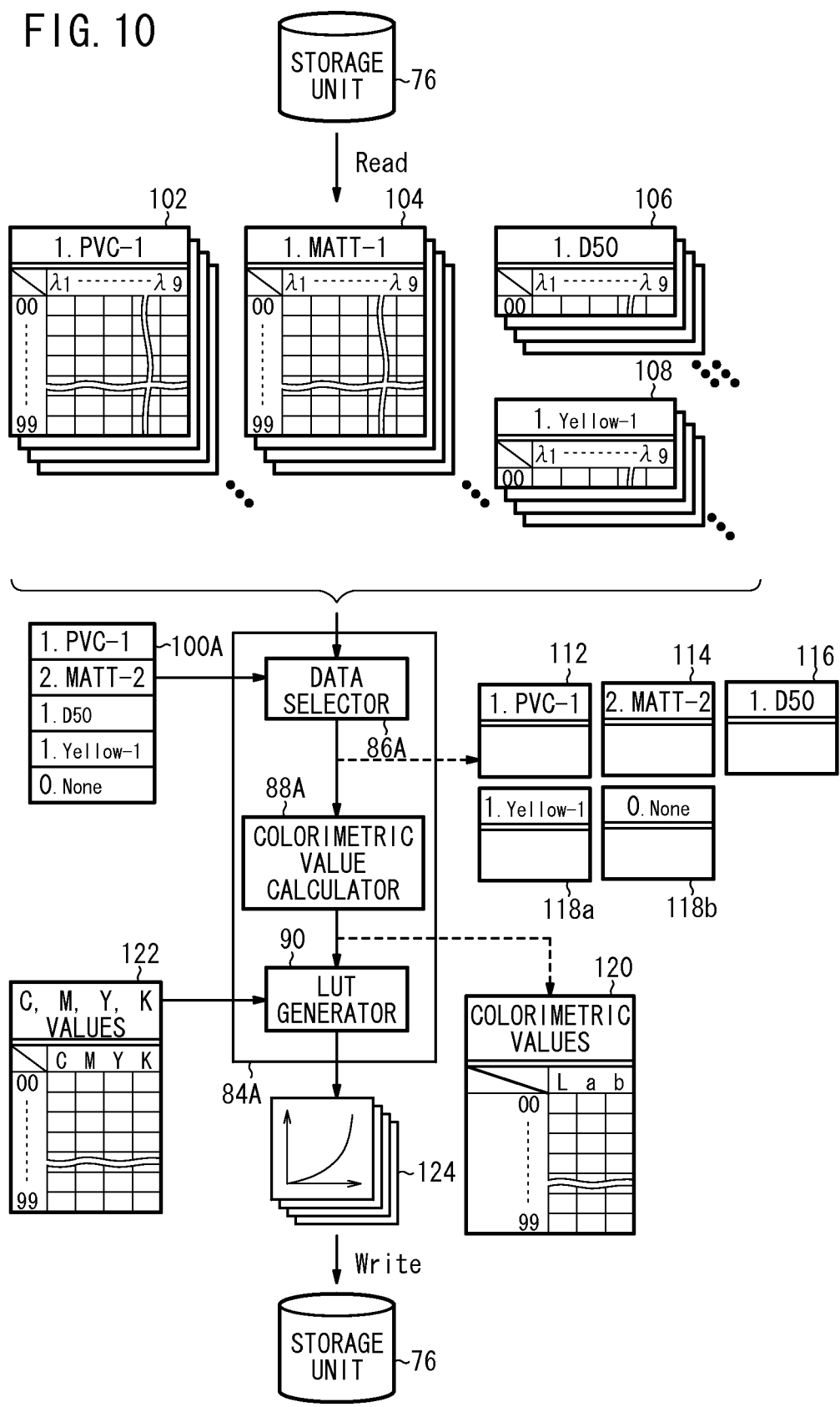
FIG. 10 is a functional block diagram of a print profile generator according to the second embodiment.

FIG. 10 is a functional block diagram of a print profile generator 84A according to the second embodiment.

As shown in FIG. 10, the print profile generator 84A comprises a data selector 86A, a colorimetric value calculator 88A, and a LUT generator 90.

The data selector 86A selects first, second, and third spectral data 112, 114, 116, and spectral data (hereinafter referred to as "fourth spectral data 118a, 118b", a maximum of two spectral data are selectable according to the second embodiment) of the color correction filters 208, under profile generating conditions based on setting data 100A, a group 102 of spectral data of print mediums, a group 104 of laminating film spectral data, a group 106 of spectral data of observational light sources, and a group 108 of spectral data of color correction filters. The setting data 100A represent various types of print media 36, the laminating film 40, types of observational light sources S, and types of color correction filters 208, which are set by the operator, and which serve as setting data relative to profile generating conditions.

The colorimetric value calculator 88A calculates colorimetric value data 120 under profile generating conditions based on the first, second, third, and fourth spectral data 112, 114, 116, 118a, 118b, which have been selected by the data selector 86A according to the color matching function referred to above (not shown).

Figure 11A:
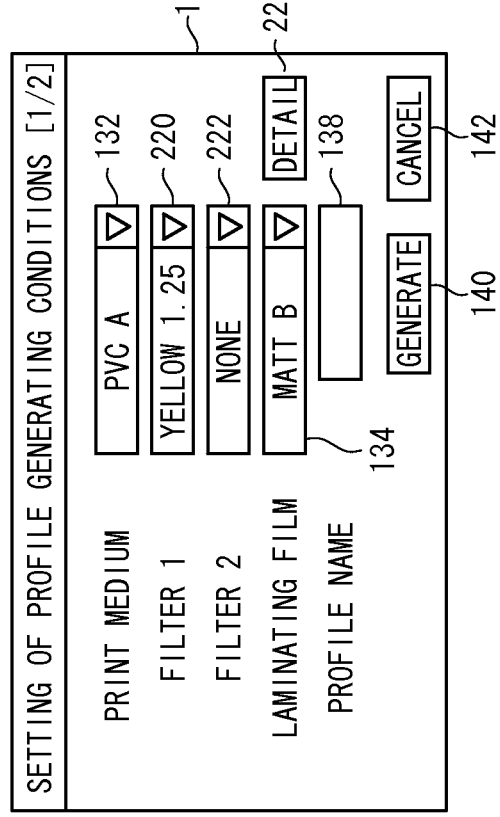
FIGS. 11A and 11B are views showing by way of example setting images for setting profile generating conditions according to the second embodiment.
Figure 11B:
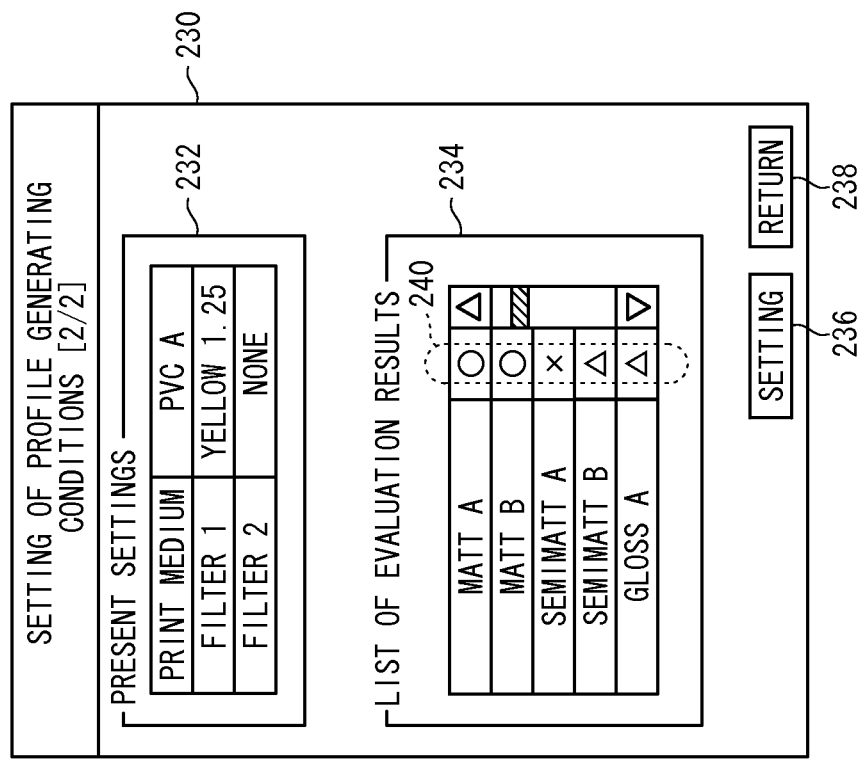

FIGS. 11A and 11B are views showing by way of example setting images for setting profile generating conditions according to the second embodiment.

FIG. 11A shows a setting image 130A having four pull-down menus 132, 220, 222, 134, a button 224 labeled "DETAIL", a textbox 138, and buttons 140, 142 labeled "GENERATE" and "CANCEL", respectively, arranged successively downward.

The setting image 130A includes a string of letters indicating "FILTER 1" on the left side of the pull-down menu 220, and a string of letters indicating "FILTER 2" on the left side of the pull-down menu 222. When the operator operates the mouse 32 in a certain way, a selection column (not shown) also is displayed beneath the pull-down menu 220, and a selection column (not shown) also is displayed beneath the pull-down menu 222.

FIG. 11B shows a setting image 230, including a display column 232 for displaying present settings (those for the print medium 36, the filter 1, and the filter 2), a display column 234 for displaying the type of laminating film 40 and its compatibility, and buttons 236, 238 labeled "SETTING" and "RETURN", respectively. The display column 234 also displays an evaluation result 240 indicating "◯", "Δ", "×", which mean "GOOD", "ORDINARY", and "POOR", respectively.

The printing system 10A according to the second embodiment is basically constructed as described above. Operations of the printing system 10A will be described below.

A profile generating method according to the second embodiment is carried out essentially based on the flowchart according to the first embodiment, except for step S1A, which differs slightly from step S1 shown in FIG. 6 as to the examination of observational manners, and step S2A, which differs slightly from step S2 shown in FIG. 6 as to the selection of a profile.

Steps S1A and S2A will be described below with reference to the flowcharts shown in FIGS. 12 and 15, as well as FIGS. 13 and 14.

Figure 12:
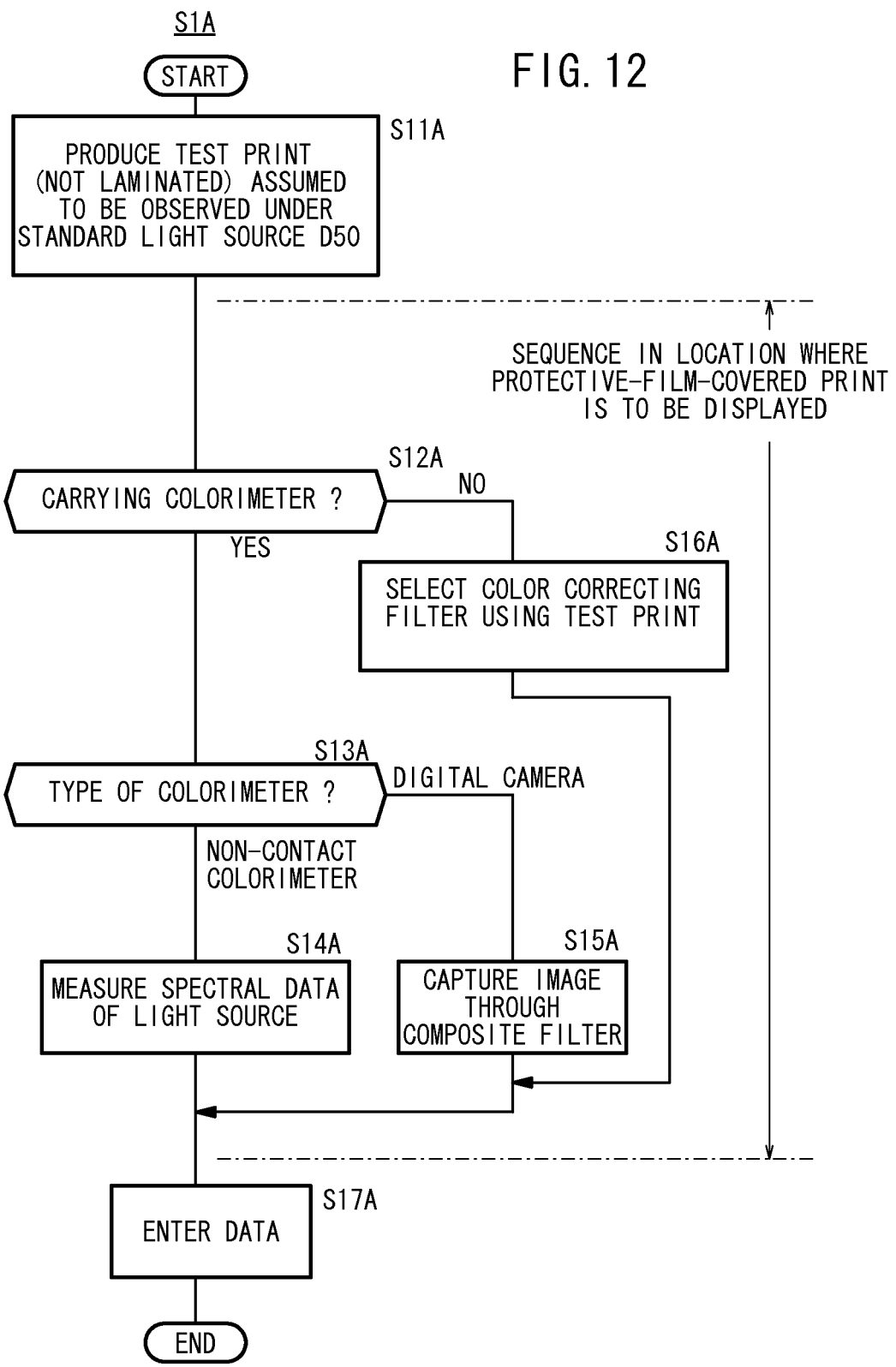
FIG. 12 is a flowchart of a sequence for acquiring spectral data of a light source at a location where the protective-film-covered print is displayed.

FIG. 12 is a flowchart of a sequence for acquiring spectral data of the light source S, which pertains to the examination of observational manners, as shown in step S1A.

First, the operator prepares a test print 38t (see FIG. 8), which is assumed to be observed under the light source D50 (step S11A), using an appropriate profile for observation under a standard light source. At this time, the image-formed surface of the test print 38t is not laminated by the laminating apparatus 20.

Thereafter, the operator goes to a location where the protective-film-covered print 42 is displayed, and performs the following process (steps S12A through S16A) at the location.

It is confirmed whether or not the operator carries a colorimeter (step S12A). If the operator carries a colorimeter, then the operator confirms the type of colorimeter (step S13A).

If the colorimeter carried by the operator is a non-contact colorimeter 206, then the operator directs the non-contact colorimeter 206 toward the white standard board 200 and colorimetrically measures the white standard board 200, thereby directly acquiring spectral data of the light source S (step S14A). Thereafter, the operator connects the non-contact colorimeter 206 to the I/F 212 of the main unit 24A, whereupon spectral data of the light source S are stored in the storage unit 76. If the colorimeter carried by the operator is a digital camera 204, then the digital camera is unable to acquire spectral data directly from the light source S. In this case, spectral data of the light source S can be estimated by acquiring and analyzing captured image data of the composite filter 202 (step S15A).

Figure 13:
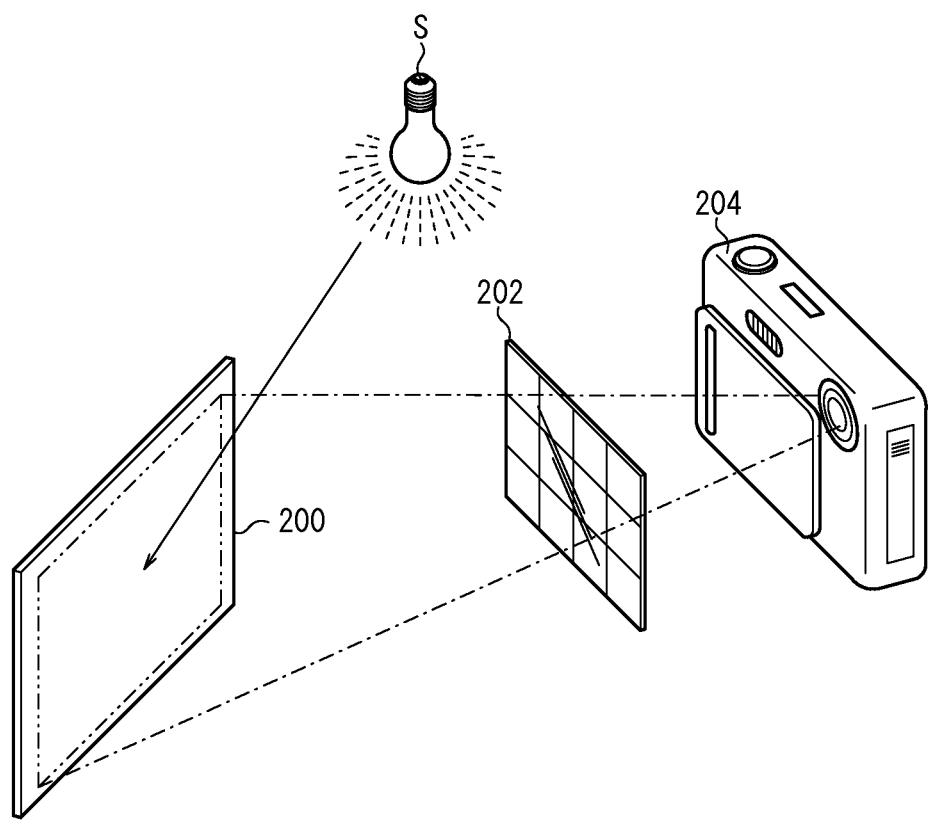
FIG. 13 is a perspective view illustrating a process of measuring spectral data of an observational light source.

FIG. 13 is a perspective view illustrating a process of measuring spectral data of the observational light source S.

In FIG. 13, the white standard board 200 and the composite filter 202 are disposed on the optical axis of the digital camera 204, within the observational environment provided by the light source S.

The composite filter 202 comprises twelve optical filters having different frequency pass bands. Optical filters, which are rectangular and substantially identical in shape, are arranged in a two-dimensional pattern. The digital camera 204 is oriented toward the white standard board 200 and the composite filter 202, and includes an image capturing device (not shown) such as a CCD, a CMOS device, or the like, having known spectral data (photosensitivity characteristics).

In the layout shown in FIG. 13, the image capturing optical system (not shown) of the digital camera 204 is adjusted to keep the entire composite filter 202 within an image capturing area of the digital camera 204. Thereafter, the digital camera 204 captures an image of the composite filter 202, i.e., the white standard board 200.

Thereafter, the digital camera 204 is connected to the I/F 212 of the main unit 24A. Image data captured by the digital camera 204 are delivered and stored in the storage unit 76, from which the image data are supplied to the spectral data estimator 210 (see FIG. 9).

The spectral data estimator 210 extracts data representing the area of the composite filter 202 from the area represented by the captured image data supplied from the digital camera 204. The spectral data estimator 210 divides the extracted data into respective areas, including respective optical filters having different frequency pass bands, and acquires R, G, B values corresponding to the respective optical filters from the divided areas.

Spectral data of the light source S can be estimated according to a known parameter estimating process such as a least squares method, based on the acquired R, G, B values corresponding to the respective optical filters, known spectral data (photosensitivity characteristics) of the digital camera 204, and known spectral data (spectral transmittances) of the optical filters.

If the operator does not have a colorimeter, then the operator selects an optimum color correction filter 208 using the test print 38t (step S16A in FIG. 12).

Figure 14:
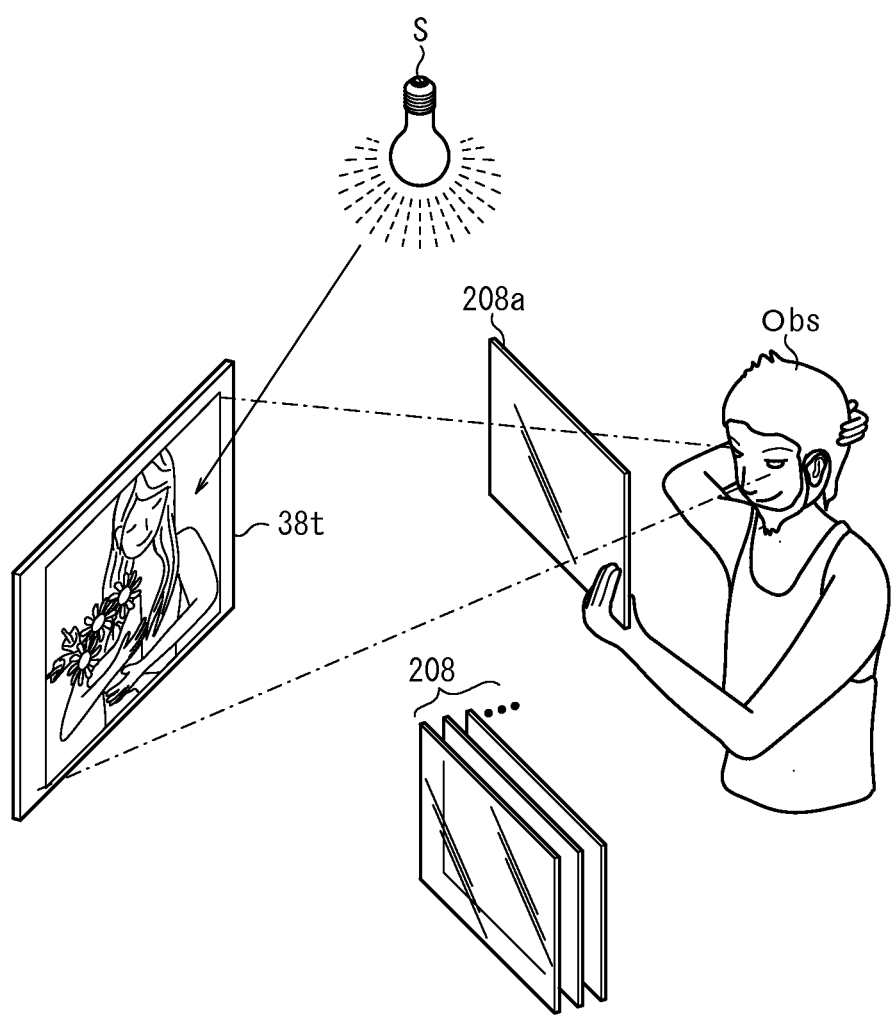
FIG. 14 is a perspective view illustrating a process of quantifying differences between appearances of colors of images with an observational light source and with a standard light source, using color correction filters.

FIG. 14 is a perspective view illustrating a process of quantifying differences between the appearance of image colors with the observational light source S and with the standard light source (D50) using the color correction filters 208.

A test print 38t has appropriate gradations in the observational environment provided by the standard light source (light source D50). However, the test print 38 may not be appropriate under the light source S.

In FIG. 14, the observer Obs, i.e., the operator, confirms the color of the image of the test print 38t through a color correction filter 208a, which is held by the observer Obs at a position between the observer's eyes and the test print 38t.

If the observer Obs judges that the color of the image of the test print 38t, as observed through the color correction filter 208a, is not appropriate, then the observer Obs replaces the color correction filter 208a with another color correction filter 208 having a different frequency pass band, and similarly observes the test print 38t.

The observer Obs repeatedly uses various color correction filters 208 and observes the test print 38t through such color correction filters 208 until the observer Obs finds and selects a color correction filter 208 that enables the observer Obs to observe the most appropriate color of the image of the test print 38t.

The observer Obs is capable of selecting not only one color correction filter 208, but may select two or more color correction filters 208, having identical or different frequency pass bands, which are used in superposition.

The standard light source (light source D50) can be simulated by observing a test print 38t through the selected color correction filter 208 under the observational light source S. More specifically, spectral data of the light source S can be estimated by multiplying the spectral data of the standard light source by the reciprocal of the spectral data (spectral transmittance) of the selected color correction filter 208.

Thereafter, as shown in FIG. 12, the operator returns to the location where the protective-film-covered print 42 will be printed, and enters various data into the image processing apparatus 16 (step S17A). The sequence for acquiring spectral data of the light source S is now brought to an end.

A flowchart of the sequence for acquiring spectral data of the light source S in a location where the protective-film-covered print 42 is displayed has been described above.

If spectral data of the light source S can be acquired (step S14A or S15A in FIG. 12), then the spectral data are stored and registered in the image processing apparatus 16, and a profile is generated according to the flowchart shown in FIG. 7. If spectral data of the light source S cannot be acquired (step S16A in FIG. 12), then another profile is generated according to another process.

The process for generating a profile (step S2A), in a case where an appropriate color correction filter 208 is selected using the test print 38t, will be described in detail below with reference to the flowchart shown in FIG. 15.

The operator confirms whether or not the type of print medium 36 for producing the print 38 has been registered (step S21A). If not yet registered, then spectral data of the print medium 36 are acquired (step S22A). The type of print medium 36 is selected and established from the pull-down menu 132 shown in FIG. 11A (step S23A). Spectral data of the print medium 36 are acquired according to the process described above.

The operator confirms whether or not the type of selected color correction filter 208 has been registered (step S24A). If not yet registered, then spectral data of the selected color correction filter 208 are acquired (step S25A). The portable memory 34 is capable of storing spectral data of the color correction filter 208, so that the operator may acquire spectral data of the color correction filter 208 from the portable memory 34.

After spectral data have been saved in the storage unit 76, the type of new color correction filter 208 can be selected from the pull-down menus 220, 222 shown in FIG. 11A. In FIG. 11A, "YELLOW 1.25" and "NONE" are displayed respectively in the pull-down menus 220, 222. "YELLOW 1.25" refers to a color correction filter that increases Y density by 0.0125. "NONE" in the pull-down menu 222 indicates that only one color correction filter is selected, i.e., only "YELLOW 1.25" is selected.

The type of color correction filter 208 is thus established (step S26A).

The operator then confirms whether the type of laminating film 40 applied to the print 38 has been registered or not (step S27A). If not yet registered, spectral data of the laminating film 40 are acquired (step S28A). More specifically, the type of laminating film 40 is selected and established from the pull-down menu 134 shown in FIG. 11A (step S29A).

When selecting a type of laminating film 40, the operator may refer to results of an evaluation made by the combination evaluator 66 (see FIG. 9) concerning compatibility thereof with the color correction filter 208. When the operator presses the button 224 labeled "DETAIL" in the setting image 130A shown in FIG. 11A, the setting image 130A is changed to the setting image 230 shown in FIG. 11B. The combination evaluator 66 evaluates the compatibility of laminating films 40 with the observational light source, and immediately displays an evaluation result.

A specific evaluating process carried out by the combination evaluator 66 will be described below with respect to the print medium 38 (protective-film-covered print 42), which exhibits a reflective image.

First, spectral data in a certain observational environment are estimated. As described above, the spectral radiation distribution of the light source S is determined by $E_{STD}(\lambda_i)/T_{FIL}(\lambda_i)$, where $T_{FIL}(\lambda_i)$ represents a spectral transmittance of the color correction filter 208, which has been established beforehand.

Similar to equation (1), an error function $f_2(T)$ indicative of an error of the calculated spectral data from the standard spectral data is expressed by equation (2) shown below.

$$f_2(T) = \sum_{i=1}^{9} \left\{ 1 - \frac{T^2(\lambda i)}{T_{FIL}(\lambda i)} \right\}^2 \quad (2)$$

The spectral transmittance $T(\lambda_i)$ in equation (2) is selected from the known group 104 of laminating film spectral data. A laminating film 40 having a spectral transmittance $T(\lambda_i)$ that reduces the error function $f_2(T)$ is estimated as being highly optically compatible with the color correction filter 208, whereas a laminating film 40 having a spectral transmittance $T(\lambda_i)$ that increases the error function $f_2(T)$ is estimated as being poorly optically compatible with the color correction filter 208.

The display column 232 in the setting image 230 displays for confirmation the present settings, i.e., some of the settings (the type of the print medium 36 and the type of the color correction filter 208) of the profile generating conditions. The display column 234 in the setting image 230 displays the names of registered laminating films 40 and an evaluation result 240 of the compatibility on the right side thereof. The evaluation result 240 indicates three stages "○", "Δ", "×", which mean "GOOD", "ORDINARY", and "POOR", respectively. The operator can select one of the laminating films 40 by referring to the evaluation result 240.

The type of laminating film 40 that minimizes the error function $f_2(T)$ may automatically be established as a recommended candidate.

Since the spectral radiation distribution $E_{STD}(\lambda_i)$ of the standard light source is of a known value, the setting image 130A shown in FIG. 11A does not include a column for setting the standard spectral data. If it is desired that the standard spectral data in the standard environment be variable, then a setting column for varying the standard spectral data may be provided separately as an added feature.

Finally, profile generating conditions including the type of print medium 36 established in step S23A, the type of the two color correction filters 208 established in step S26A, and the type of laminating film 40 established in step S29A are saved (step S30A).

After a profile name to be generated has been entered and registered in the textbox 138 shown in FIG. 11A, the operator presses the "GENERATE" button 140. Various settings (setting data 100A) are now input through the input device 28 to the main unit 24, whereupon such data are automatically stored in the storage unit 76.

As shown in FIG. 10, the data selector 86A selects first, second, third and fourth spectral data 112, 114, 116, 118a, 118b, which are associated with the setting data 100A supplied from the storage unit 76, the group 102 of spectral data of print mediums, the group 104 of laminating film spectral data, and the group 106 of spectral data of observational light sources. Then, the colorimetric value calculator 88A calculates colorimetric value data 120 under the profile generating conditions, based on the first, second, third and fourth spectral data 112, 114, 116, 118a, 118b.

Subsequently, the LUT generator 90 generates a LUT 124 for converting the three-dimensional data (L*, a*, b*) of the print profile into four-dimensional data (C, M, Y, K).

With the arrangements of the present invention, it is possible to measure or estimate spectral data of the light source S.

In the present embodiments, the color chart 38c has one hundred color patches 44, there are nine spectral data, and the light wavelengths are spaced at intervals of 50 nm. However, these numerical values may be changed freely. For example, for calculating colorimetric values of the color patches 44 with higher accuracy, the light wavelengths may be spaced at intervals of 10 nm.

In the present embodiments, the printing machine 18 comprises an inkjet printing apparatus. However, the printing machine 18 may comprise an electrophotographic apparatus, a thermosensitive apparatus, or the like.

Although certain preferred embodiments of the present invention have been shown and described in detail, it should be understood that various changes and modifications may be made to the embodiments without departing from the scope of the invention as set forth in the appended claims.

What is claimed is:

1. A profile generating apparatus for generating a profile for color matching depending on optical characteristics of a protective-film-covered print, which carries a color image printed on a print medium and is covered with a protective film, comprising:
    a storage unit for storing spectral data corresponding respectively to a plurality of colors on the print medium and spectral data of the protective film;
    an input unit for entering a type of the print medium, a type of protective film, and a type of observational light source;
    a selector for selecting, from among the spectral data stored in the storage unit, spectral data corresponding to the type of the print medium, which is entered from the input unit as first spectral data, and spectral data corresponding to the type of the protective film, which is entered from the input unit as second spectral data;
    a calculator for calculating colorimetric values of the colors using the first spectral data and the second spectral data, which are selected by the selector, the profile being generated using the calculated colorimetric values of the colors;
    an evaluator for evaluating the spectral data of different types of protective films stored in the storage unit based on the spectral data of the observational light source for observing the protective-film-covered print and standard spectral data under standard conditions, and acquiring evaluation results of the different types of protective films; and
    a display device for displaying the evaluation results acquired by the evaluator in a list divided into the types of protective films.

2. A profile generating apparatus according to claim 1, further comprising:
    an acquisition unit for acquiring the spectral data of the print medium or the spectral data of the protective film, wherein the storage unit stores the spectral data of the print, which are acquired by the acquisition unit in association with the type of the print medium, and stores the spectral data of the protective film, which are acquired by the acquisition unit in association with the type of the protective film.

3. A profile generating apparatus according to claim 1, wherein the input unit further enters a type of observational light source;
    the storage unit further stores spectral data of the observational light source;
    the selector further selects, from among the spectral data stored in the storage unit, spectral data corresponding to the type of the observational light source, which is entered from the input unit as third spectral data; and
    the calculator calculates colorimetric values of the colors also using the third spectral data, which are selected by the selector.

4. A profile generating apparatus according to claim 3, wherein the input unit further enters a type of color correction optical filter for simulating the observational light source;
    the storage unit further stores spectral data of the color correction optical filter;
    the selector further selects, from among the spectral data stored in the storage unit, spectral data corresponding to the type of the color correction optical filter, which is entered from the input unit as fourth spectral data; and
    the calculator calculates colorimetric values of the colors also using the fourth spectral data, which are selected by the selector.

5. A profile generating apparatus according to claim 1, wherein the type of the print medium includes an attribute representing a transmissive image or a reflective image; and
    the calculator changes a process of calculating colorimetric values of the colors depending on the attribute.

6. A profile generating method of generating a profile for color matching depending on optical characteristics of a protective-film-covered print, which carries a color image printed on a print medium and is covered with a protective film, comprising the steps of:
    entering a type of the print medium, a type of protective film, and a type of observational light source;
    selecting, from among stored spectral data corresponding respectively to a plurality of colors on the print medium and spectral data of the protective film, spectral data corresponding to the entered type of the print medium as first spectral data, and spectral data corresponding to the entered type of the protective film as second spectral data;
    calculating colorimetric values of the colors using the selected first spectral data and the selected second spectral data, the profile being generated using the calculated colorimetric values of the colors;
    evaluating the spectral data of different types of protective films stored in a storage unit based on the spectral data of the observational light source for observing the protective-film-covered print and standard spectral data under standard conditions, and acquiring evaluation results of the different types of protective films; and
    displaying the evaluation results acquired as a result of the evaluating the spectral data in a list divided into the types of protective films.

7. A non-transitory computer-readable recording medium recording therein a program for enabling a computer to perform, for generating a profile for color matching, the functions of:
    entering a type of print medium, a type of protective film, and a type of observational light source;
    selecting, from among stored spectral data, spectral data corresponding to the entered type of the print medium as first spectral data, and spectral data corresponding to the entered type of the protective film as second spectral data;

calculating colorimetric values of the colors using the first spectral data and the second spectral data, which are selected, the profile being generated using the calculated colorimetric values of the colors;

evaluating the spectral data of different types of protective films stored in a storage unit based on the spectral data of the observational light source for observing the protective-film-covered print and standard spectral data under standard conditions, and acquiring evaluation results of the different types of protective films; and displaying the evaluation results acquired as a result of the evaluating of the spectral data in a list divided into the types of protective films.

8. A printing system including a printing machine for printing a color image on a print medium to produce a print medium, a surface treatment apparatus for covering the print medium produced by the printing apparatus with a protective film in order to produce a protective-film-covered print, and a profile generator for generating a profile for color matching depending on optical characteristics of the protective-film-covered print produced by the surface treatment apparatus, the printing system comprising:

an input unit for entering a type of the print medium, a type of protective film, and a type of observational light source;

a storage unit for storing spectral data corresponding respectively to a plurality of colors on the print medium, and spectral data of the protective film;

a selector for selecting, from among the spectral data stored in the storage unit, spectral data corresponding to the type of the print medium, which is entered from the input unit as first spectral data, and spectral data corresponding to the type of the protective film, which is entered from the input unit as second spectral data;

a calculator for calculating colorimetric values of the colors using the first spectral data and the second spectral data, which are selected by the selector, the profile being generated using the calculated colorimetric values of the colors;

an evaluator for evaluating the spectral data of different types of protective films stored in the storage unit based on the spectral data of the observational light source for observing the protective-film-covered print and standard spectral data under standard conditions, and acquiring evaluation results of the different types of protective films; and a display device for displaying the evaluation results acquired by the evaluator in a list divided into the types of protective films.

* * * * *